(12) United States Patent
Ohmori et al.

(10) Patent No.: US 7,385,761 B2
(45) Date of Patent: Jun. 10, 2008

(54) DIFFRACTION GRATING DEVICE AND OPTICAL APPARATUS

(75) Inventors: Shigeto Ohmori, Kawachinagano (JP); Koujirou Sekine, Ibaraki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 11/704,741

(22) Filed: Feb. 9, 2007

(65) Prior Publication Data
US 2007/0139778 A1    Jun. 21, 2007

Related U.S. Application Data

(62) Division of application No. 11/091,801, filed on Mar. 28, 2005, now Pat. No. 7,199,926.

(30) Foreign Application Priority Data

| Nov. 26, 2004 | (JP) | ............................. 2004-342485 |
| Nov. 26, 2004 | (JP) | ............................. 2004-342504 |
| Nov. 26, 2004 | (JP) | ............................. 2004-342526 |

(51) Int. Cl.
*G02B 5/18*      (2006.01)
*H04J 14/02*    (2006.01)

(52) U.S. Cl. ........................................ 359/569; 398/84

(58) Field of Classification Search ................ 359/566, 359/569, 571, 572, 575, 576; 398/84, 87
See application file for complete search history.

(56) References Cited

U.S. PATENT DOCUMENTS

| 3,108,279 | A | 10/1963 | Eisentraut ..................... 343/775 |
| 4,079,382 | A | 3/1978 | Henry ........................... 343/753 |
| 6,900,939 | B2 * | 5/2005 | Hoshi et al. ................. 359/569 |
| 7,139,127 | B2 * | 11/2006 | Arnold et al. ............... 359/571 |

FOREIGN PATENT DOCUMENTS

JP     2000-163791 A      6/2000

* cited by examiner

*Primary Examiner*—Alessandro Amari
(74) *Attorney, Agent, or Firm*—Sidley Austin LLP

(57) ABSTRACT

A diffraction grating device for splitting or coupling light beams permits the divergence of the light beams to be minimized easily. A first light beam is incident on a diffraction grating from the side thereof facing the inside of the device, and a second light beam is incident on the diffraction grating from the side thereof facing air. The diffraction grating transmits the first light beam by diffraction of the minus first order so that it travels in the reverse direction along the optical path of the second light beam before incidence, and transmits the second light beam by diffraction of the zero order. The second light beam, transmitted by diffraction of the zero order, spreads over a certain width of wavelengths, but does not diverge even after diffraction.

4 Claims, 11 Drawing Sheets

DIFFRACTION GRATING DEVICE AND OPTICAL APPARATUS

This application is a divisional application of application Ser. No. 11/091,801 filed Mar. 28, 2005, now U.S. Pat. No. 7,199,926, which is based on Japanese Patent Application Nos. 2004-342485, 2004-342504, and 2004-342526 filed on Nov. 26, 2004, the contents of which are hereby incorporated by reference.

BACKGROUND OF THE INVENTION

1. Field of the Invention

The present invention relates to a diffraction grating device designed to diffract light of different wavelengths, and to an optical apparatus that transmits and receives light of different wavelengths.

2. Description of Related Art

In optical communication, optical transport members such as optical fibers are used to achieve bi-directional transport of light of different wavelengths. In an optical apparatus used to transmit and receive light to perform such optical communication, i.e., in an optical apparatus that, on one hand, makes light carry signals and then transmits the light to an optical transport member and that, on the other hand, receives light from the optical transport member and then detects the signal carried by the light, it is necessary to share a single optical transport medium to handle both the transmitted and received light but to arrange in different positions a light emitter for transmitting light and a light receiver for receiving light. To achieve this, a splitting/coupling member for splitting and coupling light beams is arranged on an extension line from the optical transport member so that the optical path from the light emitter to the splitting/coupling member and the optical path from the splitting/coupling member to the light receiver are split from each other while the optical paths of those two light beams are coupled together (i.e., made coincident with each other) between the splitting/coupling member and the optical transport member.

To increase communication traffic, an optical transport member is often made to transport light of different wavelengths in the same direction. An optical apparatus of this type is provided with a plurality of light emitters or light receivers, and is further provided with either a plurality of splitting/coupling members or a single splitting/coupling member that has the capability of splitting light of different wavelengths fed from an optical transport member.

A splitting/coupling member is typically realized by the use of a multiple-layer film that reflects or transmits incident light according to wavelength. A multiple-layer film, however, has the disadvantages of requiring a complicated and time-consuming process for the production thereof and being expensive.

The splitting and coupling of light beams needs to be performed not only in an optical apparatus for optical communication but also in an optical recording/reproducing apparatus that uses light to achieve the recording and reading of information to and from a recording medium. Japanese Patent Application Laid-Open No. 2000-163791 proposes the use, as a splitting/coupling member, of a diffraction grating that diffracts incident light at different angles according to wavelength in the optical head of an optical recording/reproducing apparatus that uses light of different wavelengths.

A diffraction grating consists simply of elevations and depressions arranged periodically, and can therefore be produced by resin molding. Accordingly, a diffraction grating device provided with a diffraction grating has the advantage of being suitable for mass production and being inexpensive.

By exploiting the wavelength dependence of the diffraction angle offered by a diffraction grating, it is possible to spatially split a plurality of light beams having different wavelengths. To achieve significant splitting, however, the diffraction grating needs to have the elevations and depressions thereof formed with a small period. Moreover, since the light that is made incident on the diffraction grating to be diffracted thereby is spread within a certain width of wavelengths, even when a parallel light beam is made incident on the diffraction grating, the diffracted light beam inevitably becomes divergent. The divergence of the diffracted light beam is greater the wider the wavelength band of the incident light and the smaller the period of the diffraction grating.

In an apparatus for optical communication, if the diffracted light beam is divergent, part of the light to be transmitted may fail to enter the optical transport member, or part of the light emerging from the optical transport member may fail to enter the light receiver. This results in lower correctness in the signals transmitted and received. To prevent this, optical members for condensing light need to be arranged between the optical transport member and the splitting/coupling member and between the splitting/coupling member and the light receiver. This, however, has the disadvantage of making the apparatus larger.

In an optical recording/reproducing apparatus, if the diffracted light beam is divergent, the light cannot be converged in a very small area on a recording medium, resulting in a lower recording density, or part of the light reflected from the recording medium may fail to enter the light receiver, resulting in lower reading accuracy. To prevent this, the movable objective lens that is arranged between the splitting/coupling member and the recording medium needs to be made larger. This, however, has the disadvantages of making the apparatus larger and lowering the response speed of the objective lens and thus the processing speed of the apparatus.

The diffraction efficiency of a diffraction grating tends to be lower the smaller the period of the elevations and depressions thereof. One way of maintaining high diffraction efficiency while making the period of the elevations and depressions small is to adopt a Littrow arrangement, an arrangement in which the diffracted light beam is closer to the incident light beam than the normal to the diffraction grating at the incidence position. However, in an optical apparatus for optical communication, adopting the Littrow arrangement requires the optical transport member and the light receiver to be arranged spatially close together, making their arrangement difficult.

Moreover, making the period of the elevations and depressions of a diffraction grating smaller results in a greater difference between the diffraction efficiency for the polarization component that is p-polarized with respect to the diffraction grating and the diffraction efficiency for the polarization component that is s-polarized. In optical communication, it is customary to use linearly polarized light to transport signals, and therefore failing to take into consideration the polarization direction of light with respect to a diffraction grating results in lower intensity of the transmitted and received light, leading to lower correctness in the signals transmitted and received.

SUMMARY OF THE INVENTION

An object of the present invention is to solve the various problems described above that are experienced with a diffraction grating device that is designed to diffract light of different wavelengths. More specifically, a first object of the present invention is to provide a diffraction grating device for splitting or coupling light beams that permits the divergence of the light beams to be minimized easily, to provide a diffraction grating device that offers high diffraction efficiency while simultaneously offering a great angle difference between the incident and diffracted light beams, and to provide a diffraction grating device that offers high diffraction efficiency regardless of the polarization direction of the incident light.

Another object of the present invention is to provide a high-performance optical apparatus that splits or couples a plurality of light beams having different wavelengths. More specifically, a second object of the present invention is to provide an optical apparatus that can minimize the loss of light, to provide an optical apparatus that permits easy arrangement of a component for supplying a light beam and a component for receiving the light beam, and to provide an optical apparatus that can minimize the lowering of the intensity of light.

To achieve the above objects, in one aspect of the present invention, in a diffraction grating device on which a first light beam having a first wavelength and a second light beam having a second wavelength longer than the first wavelength are made incident from different directions and that makes the first light beam emerge therefrom in the direction from which the second light beam is incident, the following relationships are fulfilled:

$n2 \geq n1 \cdot \sin \theta$;

$\Lambda/\lambda L \leq 1/(n1 + n1 \cdot \sin \theta)$; and $\Lambda/\lambda S \geq 1/(n1 + n1 \cdot \sin \theta) - 0.04$, where
- n1 represents the refractive index of the first medium present on that side of the diffraction grating on which the first light beam is incident;
- n2 represents the refractive index of the second medium present on that side of the diffraction grating opposite to the side thereof on which the first light beam is incident;
- $\Lambda$ represents the period of the elevations and depressions on the diffraction grating;
- $\lambda S$ represents the wavelength of the first light beam;
- $\lambda L$ represents the wavelength of the second light beam; and
- $\theta$ represents the incidence angle at which the first light beam is incident on the diffraction grating.

This diffraction grating device transmits, by diffraction, the first light beam having wavelength $\lambda S$, and transmits, without diffraction, the second light beam having wavelength $\lambda L$. Thus, this diffraction grating device does not introduce divergence into the second light beam.

To achieve the above objects, in another aspect of the present invention, in a diffraction grating device on which a first light beam having a first wavelength and a second light beam having a second wavelength longer than the first wavelength are made incident from different directions and that makes the first light beam emerge therefrom in the direction from which the second light beam is incident, the following relationships are fulfilled:

$n2 < n1 \cdot \sin \theta$;

$\Lambda/\lambda L \leq 1/(n1 + n1 \cdot \sin \theta)$; and $1/(n1 + n1 \cdot \sin \theta) \leq \Lambda/\lambda S \leq 1/(n2 + n1 \cdot \sin \theta)$, where
- n1 represents the refractive index of the first medium present on that side of the diffraction grating on which the first light beam is incident;
- n2 represents the refractive index of the second medium present on that side of the diffraction grating opposite to the side thereof on which the first light beam is incident;
- $\Lambda$ represents the period of the elevations and depressions on the diffraction grating;
- $\lambda S$ represents the wavelength of the first light beam;
- $\lambda L$ represents the wavelength of the second light beam; and
- $\theta$ represents the incidence angle at which the first light beam is incident on the diffraction grating.

This diffraction grating device reflects, by diffraction, the first light beam having wavelength $\lambda S$, and reflects, without diffraction, the second light beam having wavelength $\lambda L$. Thus, this diffraction grating device does not introduce divergence into the second light beam.

To achieve the above objects, in another aspect of the present invention, in a diffraction grating device on which a first light beam having a first wavelength and a second light beam having a second wavelength longer than the first wavelength are made incident from different directions and that makes the first light beam emerge therefrom in the direction from which the second light beam is incident, the following relationships are fulfilled:

$n2 < n1 \cdot \sin \theta$;

$1/(n1 + n1 \cdot \sin \theta) \leq \Lambda/\lambda L \leq 1/(n2 + n1 \cdot \sin \theta)$; and $1/(n2 + n1 \cdot \sin \theta) \leq \Lambda/\lambda S \leq 2/(n1 + n1 \cdot \sin \theta)$, where
- n1 represents the refractive index of the first medium present on that side of the diffraction grating on which the first light beam is incident;
- n2 represents the refractive index of the second medium present on that side of the diffraction grating opposite to the side thereof on which the first light beam is incident;
- $\Lambda$ represents the period of the elevations and depressions on the diffraction grating;
- $\lambda S$ represents the wavelength of the first light beam;
- $\lambda L$ represents the wavelength of the second light beam; and
- $\theta$ represents the incidence angle at which the first light beam is incident on the diffraction grating.

This diffraction grating device reflects, by diffraction, the second light beam having wavelength $\lambda L$, and reflects, without diffraction, the first light beam having wavelength $\lambda S$. Thus, this diffraction grating device does not introduce divergence into the first light beam.

To achieve the above objects, in another aspect of the present invention, in a diffraction grating device on which a first light beam having a first wavelength and a second light beam having a second wavelength longer than the first wavelength are made incident from different directions, the diffraction grating device making the first light beam emerge therefrom in the direction from which the second light beam is incident, the following relationships are fulfilled:

$$n2 \geq n1 \cdot \sin \theta;$$

$$\Lambda/\lambda L \leq 1/(n2+n1\cdot\sin \theta); \text{ and}$$

$$1/(n2+n1\cdot\sin \theta)-0.04<\Lambda/\lambda S<1/(n2+n1\cdot\sin \theta)+0.02,$$

where
- n1 represents the refractive index of the first medium present on that side of the diffraction grating on which the first light beam is incident;
- n2 represents the refractive index of the second medium present on that side of the diffraction grating opposite to the side thereof on which the first light beam is incident;
- $\Lambda$ represents the period of the elevations and depressions on the diffraction grating;
- $\lambda S$ represents the wavelength of the first light beam;
- $\lambda L$ represents the wavelength of the second light beam; and
- $\theta$ represents the incidence angle at which the first light beam is incident on the diffraction grating.

This diffraction grating device transmits, without diffraction, the second light beam having wavelength $\lambda L$, and reflects, without diffraction, the first light beam having wavelength $\lambda S$. Thus, this diffraction grating device does not introduce divergence into either of the first and second light beams.

In any of the diffraction grating devices described above, there may be further provided, separate from the surface on which the diffraction grating is formed, a surface capable of condensing light. This makes it possible to further reduce the divergence of the light beams, and even to make the light beams convergent.

The diffraction grating may be formed on a curved surface. This makes it possible to give the diffraction grating an optical power arising from refraction, and thus makes it possible to further reduce the divergence of the light beams after diffraction, and even to make the light beams convergent.

In that case, preferably, at a given point on the curved surface on which the diffraction grating is formed, the diffraction grating is projected onto the plane tangent thereto at that point, and the period $\Lambda$ of the elevations and depressions of the diffraction grating as observed on that plane and the incidence angle $\theta$ with respect to that plane are so chosen as to fulfill the relationships noted above.

Preferably, the elevations and depressions of the diffraction grating are given a substantially rectangular sectional shape as observed parallel to the direction of the period of the elevations and depressions. This makes it easy to design the diffraction grating, and makes it easy to produce the diffraction grating device by resin molding.

To achieve the above objects, according to another aspect of the present invention, an optical apparatus that splits or couples a plurality of light beams having different wavelengths is provided with one of the diffraction grating devices described above and uses the diffraction grating to split or couple the light beams. Thanks to the diffraction grating device being so designed as to reduce the divergence of the light beams after diffraction, it is possible to direct the light beams into a small area, and thereby to realize a diffraction grating device that operates with reduced loss of light.

Here, preferably, there is further provided a mechanism for varying the incidence angle at which a light beam is incident on the diffraction grating. With this construction, even in a case where the wavelength of light varies with temperature or the like, by varying the incidence angle, it is possible to make the diffracted light beam travel in a fixed direction.

There may be further provided an optical component that makes the light beam having the first wavelength incident on the diffraction grating and that receives the light beam having the second wavelength emerging from the diffraction grating. With this construction, the diffraction grating device requires only a single optical component through which to receive light of the first wavelength from the outside and through which to emit light of the second wavelength to the outside. An example of such an optical component is an optical fiber.

There may be further provided an optical component that condenses a light beam incident on or emerging from the diffraction grating. With this construction, it is possible to turn a light beam incident on the diffraction grating into a more closely parallel light beam, and to further reduce the divergence of the light beam emerging from the diffraction grating. Thus, it is possible to realize a diffraction grating device that operates with further reduced loss of light.

To achieve the above objects, according to another aspect of the present invention, in a diffraction grating device that diffracts and reflects a light beam in a first band of wavelengths and that diffracts and reflects and thereby separates a plurality of light beams in a plurality of bands of wavelengths longer than the wavelengths of the first band, the plurality of light beams being incident from the direction in which the light beam in the first band of wavelengths is diffracted, the elevations and depressions on the diffraction grating have a first period in a first direction and a second period longer than the first period in a second direction perpendicular to the first direction. Moreover, the following relationships are fulfilled:

$$\lambda 1L < \lambda 1U < \lambda 2L < \lambda 2U < \lambda 3L < 3U;$$

$$n2 < n1\cdot\sin \theta;$$

$$\phi \neq 0$$

$$1/[n1\cdot(1-\sin^2 \theta \cdot \sin^2 \phi)^{1/2}+n1\cdot\sin \theta \cdot\cos \phi] \leq \Lambda/\lambda 3U < \Lambda/\lambda 2L \leq 1/[(n2^2-n1^2\cdot\sin^2 \theta\cdot\sin^2 \phi)^{1/2}+n1\cdot\sin \theta\cdot\cos \phi]; \text{ and}$$

$$1/[(n2^2-n1^2\cdot\sin^2 \theta\cdot\sin^2 \phi)^{1/2}+n1\cdot\sin \theta\cdot\cos \phi] \leq \Lambda/\lambda 1U < \Lambda/\lambda 1L \leq 2/[n1\cdot(1-\sin^2 \theta\cdot\sin^2 \phi)^{1/2}+n1\cdot\sin \theta\cdot\cos \phi],$$

where
- n1 represents the refractive index of the first medium present on that side of the diffraction grating that faces optical paths of the light beams;
- n2 represents the refractive index of the second medium present on that side of the diffraction grating opposite to the side thereof facing the optical paths of the light beams;
- $\theta$ represents the incidence angle at which the principal ray of the light beams is incident on the diffraction grating;
- $\phi$ represents the angle between the plane perpendicular to the diffraction grating and parallel to the first direction and the incidence plane of the principal ray of the light beams;
- $\Lambda$ represents the first period of the elevations and depressions on the diffraction grating;

λ1L represents the shortest wavelength of the first band of wavelengths;

λ1U represents the longest wavelength of the first band of wavelengths;

λ2L represents the shortest wavelength of, of the plurality of bands of wavelengths longer than the wavelengths of the first band, the band of shortest wavelengths;

λ2U represents the longest wavelength of, of the plurality of bands of wavelengths longer than the wavelengths of the first band, the band of shortest wavelengths;

λ3L represents the shortest wavelength of, of the plurality of bands of wavelengths longer than the wavelengths of the first band, the band of longest wavelengths; and λ3U represents the longest wavelength of, of the plurality of bands of wavelengths longer than the wavelengths of the first band, the band of longest wavelengths.

In this diffraction grating device, the elevations and depressions of the diffraction grating have one period in the first direction and another period in the second direction, making it possible to produce diffraction also in the second direction. Thus, all the light beams can be made incident on the diffraction grating from directions inclined relative to the first direction so as to split, also in the second direction, the light beams in the plurality of bands of wavelengths longer than the wavelengths of the first band. This makes greater the angle difference between the incident light beam in the first band of wavelengths and the diffracted light beams in the plurality of bands of wavelengths longer than the wavelengths of the first band. In addition, fulfilling the relationships noted above permits the diffraction grating to reflect, without diffraction, the light beam in the first band of wavelengths and to reflect, while producing diffraction of the minus first order in them, the plurality of light beams in the bands of wavelengths longer than the wavelengths of the first band. As a result, the diffraction grating and the plurality of light beams in the bands of wavelengths longer than the wavelengths of the first band fulfill a relationship close to the Littrow arrangement, resulting in higher diffraction efficiency with those light beams.

To achieve the above objects, according to another aspect of the present invention, in a diffraction grating device that separates a plurality of light beams spread in different wavelength bands and overlapping with one another, the elevations and depressions of the diffraction grating have a first period in a first direction and a second period longer than the first period in a second direction perpendicular to the first direction. Moreover, the diffraction grating diffracts and reflects a light beam incident thereon in the same direction from which the light beam is incident with respect to the normal to the diffraction grating at the position at which the light beam is incident. Here, the angle between the plane perpendicular to the diffraction grating and parallel to the first direction and the incidence plane of the principal ray of the light beam incident on the diffraction grating is 0.5° or more but 15° or less.

This diffraction grating device fulfills a relationship close to the Littrow arrangement with the plurality of light beams spread in the different wavelength bands, resulting in high diffraction efficiency. Moreover, the elevations and depressions of the diffraction grating have one period in the first direction and another period in the second direction, and the light beams are made incident on the diffraction grating from directions inclined relative to the first direction. This makes it possible to split the light beams also in the second direction. This makes greater the angle difference between the incident light beams and the separated light beams, and makes greater the angle differences among the separated light beams.

In any of the diffraction grating devices described above, preferably, the elevations and depressions of the diffraction grating are given a substantially rectangular sectional shape as observed parallel to the direction of the period of the elevations and depressions. This makes it easy to design the diffraction grating, and makes it easy to produce the diffraction grating device by resin molding.

To achieve the above objects, according to another aspect of the present invention, in an optical apparatus provided with a first optical component that supplies a light beam in a first band of wavelengths and a second optical component that supplies a plurality of light beams in different bands of wavelengths longer than the wavelengths of the first band and that receives the light beam in the first band of wavelengths from the first optical component, the optical apparatus is further provided with the former diffraction grating devices, and uses the diffraction grating to diffract and reflect and thereby direct the light beam from the first optical component to the second optical component and to diffract and reflect and thereby separate the plurality of light beams from the second optical component.

In this optical apparatus, thanks to the design of the diffraction grating device, it is possible to efficiently direct the light beam from the first optical component to the second optical component, and to efficiently separate the plurality of light beams from the second optical component, while permitting the first and second optical components to be arranged in positions where they do not interfere with each other.

Here, the second optical component may be an optical fiber. This makes the diffraction grating device suitable for optical communication.

Advisably, there is further provided an optical component that condenses a light beam incident on or emerging from the diffraction grating. This makes it possible to reduce the divergence of the light beams, resulting in higher light use efficiency.

To achieve the above objects, according to another aspect of the present invention, in an optical apparatus provided with an optical component that supplies a plurality of light beams spread in different wavelength bands and overlapping with one another, the optical apparatus separating the plurality of light beams, the optical apparatus is further provided with the latter diffraction grating device, and uses the diffraction grating to separate the plurality of light beams. In this optical apparatus, thanks to the design of the diffraction grating device, it is possible to efficiently separate the light beams in the different wavelength bands, and in addition makes the handling of the separated light beams easy.

Here, the component that supplies the plurality of light beams may be an optical fiber. This makes the diffraction grating device suitable for optical communication.

Advisably, there is further provided an optical component that condenses a light beam incident on or emerging from the diffraction grating. This makes it possible to reduce the divergence of the light beams, resulting in higher light use efficiency.

To achieve the above objects, according to another aspect of the present invention, in a diffraction grating device that diffracts and reflects a light beam in a first band of wavelengths and that diffracts and reflects and thereby separates a plurality of light beams in a plurality of bands of wavelengths longer than the wavelengths of the first band, the plurality of light beams being incident from the direction in which the light beam in the first band of wavelengths is diffracted, the following relationships are fulfilled:

$$\lambda 1L < \lambda 1U < \lambda 2L < \lambda 2U < \lambda 3L < \lambda 3U;$$

$$n2 < n1 \cdot \sin\theta;$$

$$1/(n1+n1\cdot\sin\theta) \leq \Lambda/\lambda 3U \leq \Lambda/\lambda 2L \leq 1/(n2+n1\cdot\sin\theta);$$

$$1/(n2+n1\cdot\sin\theta) \leq \Lambda/\lambda 1U < \Lambda/\lambda 1L \leq 2/(n1+n1\cdot\sin\theta);$$
and $$\Lambda/\lambda 3L < 1/(2\cdot n1\cdot\sin\theta) < \Lambda/\lambda 2U,$$

where
- n1 represents the refractive index of the first medium present on that side of the diffraction grating that faces optical paths;
- n2 represents the refractive index of the second medium present on that side of the diffraction grating opposite to the side thereof facing the optical paths;
- θ represents the incidence angle at which the principal ray of the light beams is incident on the diffraction grating;
- Λ represents the period of the elevations and depressions on the diffraction grating;
- λ1L represents the shortest wavelength of the first band of wavelengths;
- λ1U represents the longest wavelength of the first band of wavelengths;
- λ2L represents the shortest wavelength of, of the plurality of bands of wavelengths longer than the wavelengths of the first band, the band of shortest wavelengths;
- λ2U represents the longest wavelength of, of the plurality of bands of wavelengths longer than the wavelengths of the first band, the band of shortest wavelengths;
- λ3L represents the shortest wavelength of, of the plurality of bands of wavelengths longer than the wavelengths of the first band, the band of longest wavelengths; and
- λ3U represents the longest wavelength of, of the plurality of bands of wavelengths longer than the wavelengths of the first band, the band of longest wavelengths.

Fulfilling the relationships noted above, this diffraction grating device offers high diffraction efficiency with all the light beams in the different wavelength bands, regardless of the polarization directions thereof.

Here, advisably, the period is the period that the elevations and depressions on the diffraction grating have in a first direction substantially parallel to the incidence plane of the principal ray of the incident light beams, and the elevations and depressions on the diffraction grating have another period in a second direction perpendicular to the first direction. With this construction, the light beams can be made incident on the diffraction grating from directions inclined relative to the first direction so as to produce diffraction also in the second direction. This makes greater the angle differences among the separated light beams.

Preferably, the following relationship is fulfilled:

$$\Lambda^2/\lambda 2L^2 \leq \Lambda y^2/\lambda 2L^2 < 1/\{n1^2 \cdot [1-(\sin\theta - 1.1\cdot\lambda 2L/(n1\cdot\Lambda))^2]\}$$

where
- Λy represents the period of the elevations and depressions on the diffraction grating in the second direction.

Fulfilling this relationship helps reduce unnecessary diffraction, and helps increase diffraction efficiency.

Preferably, the elevations and depressions of the diffraction grating are given a substantially rectangular sectional shape as observed parallel to the direction of the period of the elevations and depressions. This makes it easy to design the diffraction grating, and makes it easy to produce the diffraction grating device by resin molding.

To achieve the above objects, according to another aspect of the present invention, in an optical apparatus provided with a first optical component that supplies a light beam in a first band of wavelengths and a second optical component that supplies a plurality of light beams in different bands of wavelengths longer than the wavelengths of the first band and that receives the light beam in the first band of wavelengths from the first optical component, the optical apparatus is provided with one of the diffraction grating devices described above, and uses the diffraction grating to diffract and reflect and thereby direct the light beam from the first optical component to the second optical component and to diffract and reflect and thereby separate the plurality of light beams from the second optical component.

In this optical apparatus, thanks to the design of the diffraction grating device, regardless of the polarization direction of the light beams, it is possible to efficiently direct the light beam from the first optical component to the second optical component, and to efficiently separate the light beams in the different wavelength bands from the second optical component.

The second optical component may be an optical fiber. This makes the diffraction grating device suitable for optical communication.

There may be further provided an optical component that condenses a light beam incident on or emerging from the diffraction grating. With this construction, it is possible to turn the light beams incident on the diffraction grating into a closely parallel light beam, and to reduce the divergence of the light beams emerging from the diffraction grating. This makes it possible to direct the light beams into a small area, and thereby to realize a diffraction grating device that operates with reduced loss of light.

DETAILED DESCRIPTION OF PREFERRED EMBODIMENTS

Hereinafter, embodiments of the present invention will be described with reference to the accompanying drawings.

First Embodiment

Figure 1:
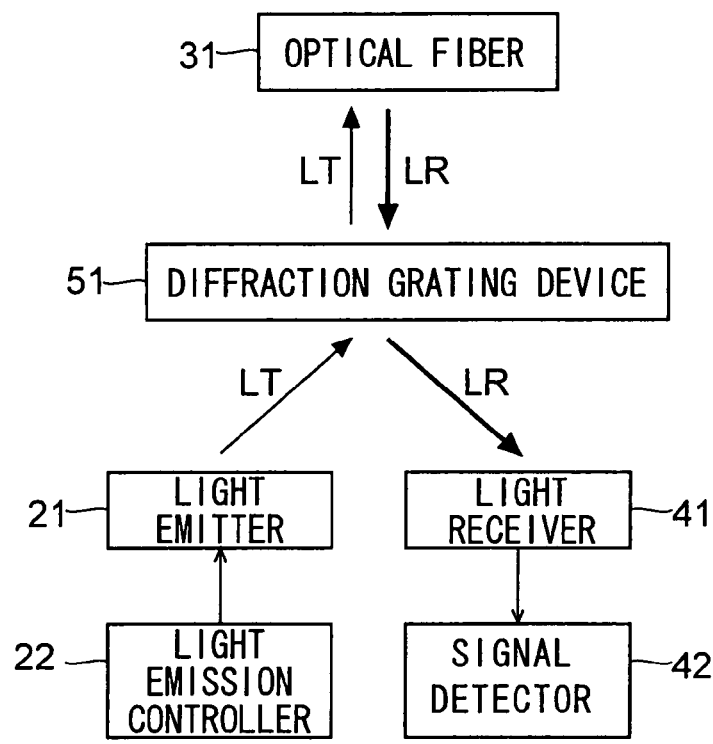
FIG. 1 is a diagram schematically showing the construction of the optical apparatus of a first embodiment of the invention.

FIG. 1 schematically shows the construction of the optical apparatus 1 of a first embodiment of the invention. The optical apparatus 1 is a transmitter/receiver apparatus for use in optical communication, and includes a light emitter 21, a light emission controller 22, an optical fiber 31, a light receiver 41, a signal detector 42, and a diffraction grating device 51.

The light emitter 21 emits a light beam LT to be transmitted. The light emission controller 22 controls the light emission by the light emitter 21 so as to make the light beam LT emitted by the light emitter 21 carry a signal to be transmitted. The light emitter 21 includes, though not illustrated, a laser diode and a condenser lens so as to emit a parallel light beam obtained by condensing with the condenser lens the light emitted by the laser diode.

The optical fiber 31 transmits to the outside the light beam LT, carrying the signal to be transmitted, from the light emitter 21. The optical fiber 31 also receives from the outside a light beam LR carrying a signal to be received.

The light receiver 41 receives the light beam LR received by the optical fiber 31, and outputs a signal that represents the amount of received light. The signal detector 42 detects from the output signal of the light receiver 41 the signal carried by the light beam LR. The light beam LT and the light beam LR are in different wavelength bands that are apart from each other. The wavelength of the light beam LT is shorter than that of the light beam LR.

The diffraction grating device 51 has a diffraction grating 52 (see FIG. 2) formed on the surface thereof so as to direct the light beam LT from the light emitter 21 to the optical fiber 31 and to direct the light beam LR from the optical fiber 31 to the light receiver 41.

Now, the design of the diffraction grating 52 will be described. Here, it is assumed that the period of the elevations and depressions of the diffraction grating 52 is $\Lambda$; that the height difference between the elevations and depressions of the diffraction grating 52 is h; that, of the two media between which the diffraction grating 52 is sandwiched, the one present on the side thereof on which the light beam LT is incident has a refractive index of n1 and the other has a refractive index of n2; that the incidence angle at which the light beam is incident on the diffraction grating 52 is $\theta1$; the emergence angle at which the light beam emerges from the diffraction grating 52 is $\theta2$; that the center wavelength of the light beam LT having the shorter wavelength is $\lambda S$; and that the center wavelength of the light beam LR having the longer wavelength is $\lambda L$.

The diffraction grating 52 fulfills the relationships (A1) to (A3) below.

$$n2 \geq n1 \cdot \sin \theta1 \tag{A1}$$

$$\Lambda/\lambda L \leq 1/(n1+n1 \cdot \sin \theta1) \tag{A2}$$

$$\Lambda/\lambda S > 1/(n1+n1 \cdot \sin \theta1) \tag{A3}$$

Fulfilling these relationships, the diffraction grating 52 transmits, by diffraction of the minus first order, the light beam LT having the shorter wavelength, and transmits, by diffraction of the zero order, the light beam LR having the longer wavelength.

Figure 2:
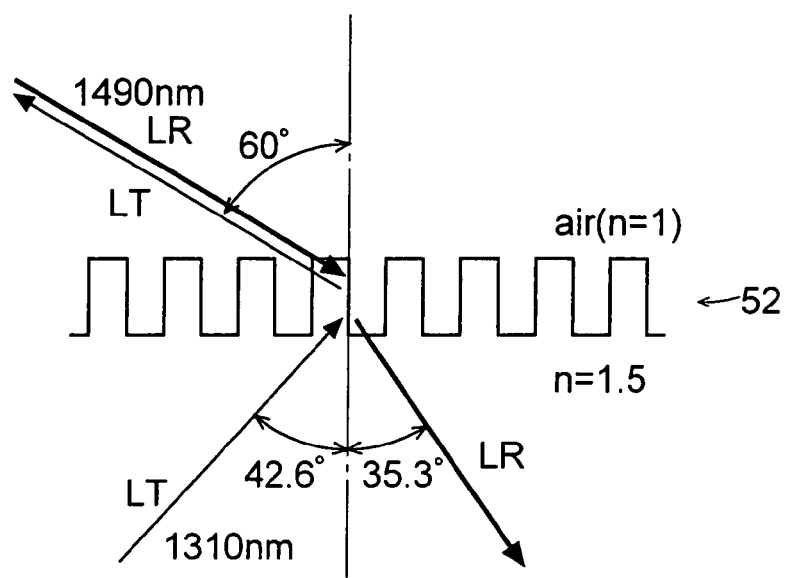
FIG. 2 is a diagram schematically showing the optical path in one practical example of the diffraction grating used in the optical apparatus of the first embodiment.

FIG. 2 schematically shows the optical path observed in one practical example. In this example, the center wavelength of the transmitted light beam LT is 1,310 nm, and the center wavelength of the received light beam LR is 1,490 nm; the light beam LT is made incident on the diffraction grating 52 from inside the diffraction grating device 51, and the light beam LR is made incident on the diffraction grating 52 from the air side thereof. The relevant parameters are listed in Table 1. Here, the incidence plane of the principal rays of the light beams LT and LR is parallel to the direction of the period of the diffraction grating 52.

TABLE 1

Diffraction Grating 52

Sectional Shape: Rectangular
Elevation-Depression Period $\Lambda$: 0.69 μm
Elevation-Depression Height Difference h: 1.39 μm
Elevation Width: 0.35 μm
Medium Refractive Index: 1.5
Light Beam LT Wavelength ($\lambda S$): 1310 nm
Period/Wavelength ($\Lambda/\lambda S$): 0.53
Incidence Angle $\theta1$: 60°
Emergence Angle $\theta2$: −42.6°
S-Polarized Light Transmission Diffraction Efficiency: 0.72
Light Beam LR Wavelength ($\lambda L$): 1490 nm
Period/Wavelength ($\Lambda/\lambda L$): 0.46

TABLE 1-continued

Incidence Angle θ1: 60°
Emergence Angle θ2: 35.3°
P-Polarized Light Transmissivity: 0.87
S-Polarized Light Transmissivity: 0.73
Mean Transmissivity: 0.8

In Table 1, the elevation width of the diffraction grating 52 denotes the width of each of the parts thereof that are elevated toward the side at which the light beam LT is incident (i.e., toward the inside of the diffraction grating device 51). Here, it should be noted that the values listed in Table 1 are those observed when, as opposed to in actual use in the optical apparatus 1, the light beams LT and LR are made incident from the same direction so as to be separated from each other. That is, in actual use in the optical apparatus 1, the incidence angle θ1 and the emergence angle θ2 of the light beam LT take the values of each other listed in Table 1.

Figure 3:
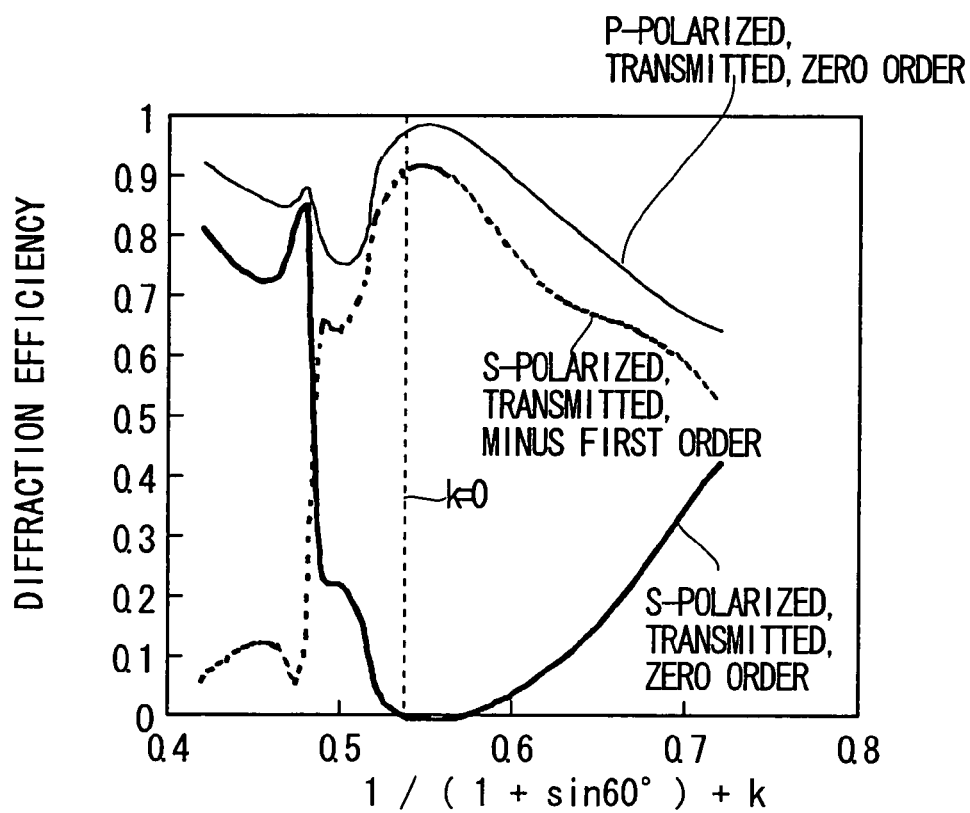
FIG. 3 is a diagram showing the relationship between the variation of the parameters of the diffraction grating and the variation of the diffraction efficiency in the optical apparatus of the first embodiment.

FIG. 3 shows how the diffraction efficiency varies as the value of $1/(n1+n1 \cdot \sin \theta 1)$, appearing in formulae (A2) and (A3), varies in the practical example (n1=1 and θ1=60°) described above. Here, the value of $1/(1+1 \cdot \sin 60°)$ is 0.536. As will be understood from FIG. 3, the transmissivity of the light beam LR, which is transmitted by diffraction of the zero order, is increased by setting the center length λL thereof within the range defined by formula (A2), and the transmissivity of the light beam LT, which is transmitted by diffraction of the minus first order, is increased by setting the center length λS thereof within the range defined by formula (A3).

Since the divergence of the light beams after diffraction is proportional to the width of the wavelength band thereof, making the diffraction grating 52 transmit, without diffraction, the light beam LR having the longer wavelength as is the case with the diffraction grating device 51 used in the optical apparatus 1 of this embodiment is effective in preventing the divergence of the light beam LR. With this design, the entire light beam LR can be directed to the light receiver 41 without making the light receiver 41 large.

Second Embodiment

The optical apparatus 2 of this embodiment, too, is for use in optical communication, and has a construction similar to that of the optical apparatus 1 shown in FIG. 1. Specifically, the optical apparatus 2 includes a light emitter 21, a light emission controller 22, an optical fiber 31, a light receiver 41, a signal detector 42, and a diffraction grating device 51. Now, the design of the diffraction grating 52 formed on the diffraction grating device 51 in the optical apparatus 2 will be described. Here, as in the first embodiment, it is assumed that the period of the elevations and depressions of the diffraction grating 52 is Λ; that the height difference between the elevations and depressions of the diffraction grating 52 is h; that, of the two media between which the diffraction grating 52 is sandwiched, the one present on the side thereof on which the light beam LT is incident has a refractive index of n1 and the other has a refractive index of n2; that the incidence angle at which the light beam is incident on the diffraction grating 52 is θ1; the emergence angle at which the light beam emerges from the diffraction grating 52 is θ2; that the center wavelength of the light beam LT having the shorter wavelength is λS; and that the center wavelength of the light beam LR having the longer wavelength is λL.

The diffraction grating 52 fulfills the relationships (B1) to (B3) below.

$$n2 < n1 \cdot \sin \theta \quad \quad (B1)$$

$$\Lambda/\lambda L \leq 1/(n1+n1 \cdot \sin \theta 1) \quad \quad (B2)$$

$$1/(n1+n1 \cdot \sin \theta 1) \leq \Lambda/\lambda S \leq 1/(n2+n1 \cdot \sin \theta 1) \quad \quad (B3)$$

Fulfilling these relationships, the diffraction grating 52 reflects, by diffraction of the minus first order, the light beam LT having the shorter wavelength, and reflects (regularly reflects), by diffraction of the zero order, the light beam LR having the longer wavelength.

Figure 4:
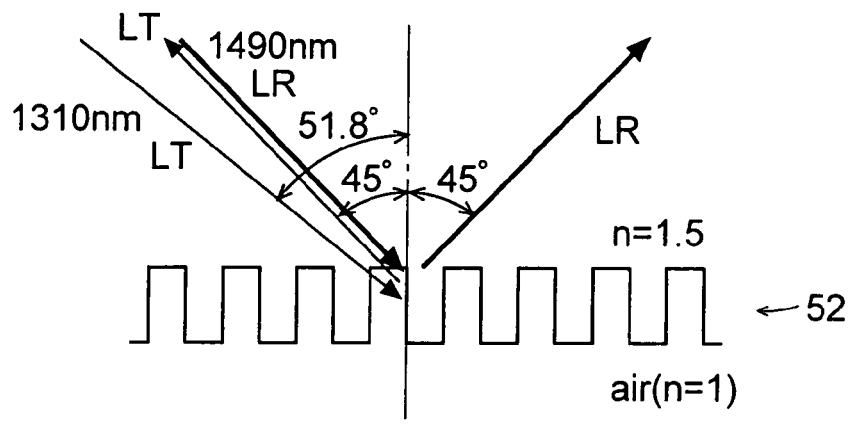
FIG. 4 is a diagram schematically showing the optical path in one practical example of the diffraction grating used in the optical apparatus of a second embodiment of the invention.

FIG. 4 schematically shows the optical path observed in one practical example. In this example, the center wavelength of the transmitted light beam LT is 1,310 nm, and the center wavelength of the received light beam LR is 1,490 nm; the light beams LT and LR are made incident on the diffraction grating 52 from inside the diffraction grating device 51. The relevant parameters are listed in Table 2. Here, the incidence plane of the principal rays of the light beams LT and LR is parallel to the direction of the period of the diffraction grating 52.

TABLE 2

Diffraction Grating 52

Sectional Shape: Rectangular
Elevation-Depression Period Λ: 0.585 μm
Elevation-Depression Height Difference h: 0.42 μm
Elevation Width: 0.293 μm
Medium Refractive Index: 1.5
Light Beam LT Wavelength (λS): 1310 nm
Period/Wavelength (Λ/λS): 0.45
Incidence Angle θ1: 45°
Emergence Angle θ2: −51.8°
S-Polarized Light Transmission Diffraction Efficiency: 0.85
Light Beam LR Wavelength (λL): 1490 nm
Period/Wavelength (Λ/λL): 0.39
Incidence Angle θ1: 45°
Emergence Angle θ2: 45°
P-Polarized Light Reflectivity: 0.89
S-Polarized Light Reflectivity: 0.86
Mean Reflectivity: 0.875

In Table 2, the elevation width of the diffraction grating 52 denotes the width of each of the parts thereof that are elevated toward the side at which the light beams LT and LR are incident (i.e., toward the inside of the diffraction grating device 51). Here, it should be noted that the values listed in Table 1 are those observed when, as opposed to in actual use in the optical apparatus 2, the light beams LT and LR are made incident from the same direction so as to be separated from each other. That is, in actual use in the optical apparatus 2, the incidence angle θ1 and the emergence angle θ2 of the light beam LT take the values of each other listed in Table 2.

The reflectivity of the light beam LR, which is reflected by diffraction of the zero order, is increased by setting the center length λL thereof within the range defined by formula (B2), and the reflectivity of the light beam LT, which is reflected by diffraction of the minus first order, is increased by setting the center length λS thereof within the range defined by formula (B3). Here, the value of $1/(1.5+1.5 \cdot \sin 45°)$ is 0.391, and the value of $1/(1+1.5 \cdot \sin 45°)$ is 0.485.

Since the divergence of the light beams after diffraction is proportional to the width of the wavelength band thereof, making the diffraction grating 52 reflect, without diffraction, the light beam LR having the longer wavelength as is the case with the diffraction grating device 51 used in the optical apparatus 2 of this embodiment is effective in preventing the divergence of the light beam LR. With this design, the entire light beam LR can be directed to the light receiver 41 without making the light receiver 41 large.

Third Embodiment

The optical apparatus 3 of this embodiment, too, is for use in optical communication, and has a construction similar to that of the optical apparatus 1 shown in FIG. 1. Specifically, the optical apparatus 3 includes a light emitter 21, a light emission controller 22, an optical fiber 31, a light receiver 41, a signal detector 42, and a diffraction grating device 51.

Now, the design of the diffraction grating 52 formed on the diffraction grating device 51 in the optical apparatus 3 will be described. Here, as in the first embodiment, it is assumed that the period of the elevations and depressions of the diffraction grating 52 is $\Lambda$; that the height difference between the elevations and depressions of the diffraction grating 52 is h; that, of the two media between which the diffraction grating 52 is sandwiched, the one present on the side thereof on which the light beam LT is incident has a refractive index of n1 and the other has a refractive index of n2; that the incidence angle at which the light beam is incident on the diffraction grating 52 is $\theta 1$; the emergence angle at which the light beam emerges from the diffraction grating 52 is $\theta 2$; that the center wavelength of the light beam LT having the shorter wavelength is $\lambda S$; and that the center wavelength of the light beam LR having the longer wavelength is $\lambda L$.

The diffraction grating 52 fulfills the relationships (C1) to (C3) below.

$$n2 < n1 \cdot \sin \theta 1 \quad (C1)$$

$$1/(n1 + n1 \cdot \sin \theta 1) \leq \Lambda/\lambda L \leq 1/(n2 + n1 \cdot \sin \theta 1) \quad (C2)$$

$$1/(n2 + n1 \cdot \sin \theta 1) \leq \Lambda/\lambda S \leq 2/(n1 + n1 \cdot \sin \theta 1) \quad (C3)$$

Fulfilling these relationships, the diffraction grating 52 reflects, by diffraction of the minus first order, the light beam LR having the longer wavelength, and reflects (regularly reflects), by diffraction of the zero order, the light beam LT having the shorter wavelength.

Figure 5:
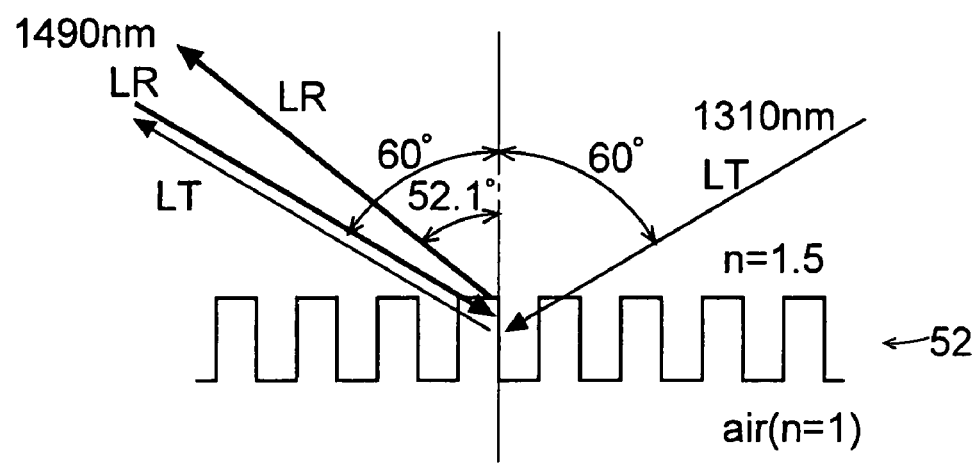
FIG. 5 is a diagram schematically showing the optical path in one practical example of the diffraction grating used in the optical apparatus of a third embodiment of the invention.

FIG. 5 schematically shows the optical path observed in one practical example. In this example, the center wavelength of the transmitted light beam LT is 1,310 nm, and the center wavelength of the received light beam LR is 1,490 nm; the light beams LT and LR are made incident on the diffraction grating 52 from inside the diffraction grating device 51. The relevant parameters are listed in Table 3-1. Here, the incidence plane of the principal rays of the light beams LT and LR is parallel to the direction of the period of the diffraction grating 52.

TABLE 3-1

Diffraction Grating 52

Sectional Shape: Rectangular
Elevation-Depression Period $\Lambda$: 0.6 μm
Elevation-Depression Height Difference h: 0.645 μm
Elevation Width: 0.3 μm
Medium Refractive Index: 1.5

TABLE 3-1-continued

Light Beam LT

Wavelength ($\lambda S$): 1310 nm
Period/Wavelength ($\Lambda/\lambda S$): 0.46
Incidence Angle $\theta 1$: 60°
Emergence Angle $\theta 2$: 60°
Reflectivity: 0.81 (−1.83 dB)

Light Beam LR

Wavelength ($\lambda L$): 1490 nm
Period/Wavelength ($\Lambda/\lambda L$): 0.40
Incidence Angle $\theta 1$: 60°
Emergence Angle $\theta 2$: −52.1°
P-Polarized Light Reflection Diffraction Efficiency: 0.83 (−1.63 dB)
S-Polarized Light Reflection Diffraction Efficiency: 0.87 (−1.20 dB)
Mean Reflection Diffraction Efficiency: 0.85 (−1.41 dB)

In Table 3-1, the elevation width of the diffraction grating 52 denotes the width of each of the parts thereof that are elevated toward the side at which the light beams LT and LR are incident (i.e., toward the inside of the diffraction grating device 51). In Table 3-1 are also listed the dB equivalent values of the reflectivity and the reflection efficiency.

The reflectivity of the light beam LR, which is reflected by diffraction of the minus first order, is increased by setting the center length $\lambda L$ thereof within the range defined by formula (C2), and the reflectivity of the light beam LT, which is reflected by diffraction of the zero order, is increased by setting the center length $\lambda S$ thereof within the range defined by formula (C3). Here, the value of $1/(1.5 + 1.5 \cdot \sin 60°)$ is 0.357, the value of $1/(1 + 1.5 \cdot \sin 60°)$ is 0.434, and the value of $2/(1.5 + 1.5 \cdot \sin 60°)$ is 0.715.

When the wavelength bands of the light beams LR and LT have the same width, the light beam LT having the shorter wavelength diverges less than the light beam RT after diffraction. However, even the light beam LT having the shorter wavelength, as the width of the wavelength band thereof increases, diverges more after diffraction. This makes it difficult to make the entire light beam LT enter the optical fiber 31. In the diffraction grating device 51 used in the optical apparatus 3 of this embodiment, however, the diffraction grating 52 produces diffraction of the zero order, i.e., no diffraction, in the light beam LT. This prevents the light beam LT from diverging, and makes it easy to make the entire light beam LT enter the optical fiber 31, of which the diameter is as small as of the order of μm.

The parameters related to the light beam LT as observed when the wavelength band of the light beam LT has a width of ±50 nm around wavelength $\lambda S$ are listed in Tables 3-2 and 3-3. The parameters related to the light beam LR as observed when the wavelength band of the light beam LR has a width of ±10 nm around wavelength $\lambda L$ are listed in Tables 3-4 and 3-5. The parameters other than those listed in these tables are the same as in Table 3-1.

TABLE 3-2

Light Beam LT

Shortest Wavelength ($\lambda S$ − 50): 1260 nm
Period/Wavelength ($\Lambda/(\lambda S - 50)$): 0.48
Incidence Angle $\theta 1$: 60°
Emergence Angle $\theta 2$: 60°
Reflectivity: 0.85 (−1.43 dB)

TABLE 3-3

Light Beam LT

Longest Wavelength (λS + 50): 1360 nm
Period/Wavelength (Λ/(λS + 50)): 0.44
Incidence Angle θ1: 60°
Emergence Angle θ2: 60°
Reflectivity: 0.78 (−2.11 dB)

TABLE 3-4

Light Beam LR

Shortest Wavelength (λL − 10): 1480 nm
Period/Wavelength (Λ/(λL − 10)): 0.41
Incidence Angle θ1: 60°
Emergence Angle θ2: −51.1°
P-Polarized Light Reflection Diffraction Efficiency: 0.82 (−1.76 dB)
S-Polarized Light Reflection Diffraction Efficiency: 0.81 (−1.80 dB)
Mean Reflection Diffraction Efficiency: 0.81 (−1.78 dB)

TABLE 3-5

Light Beam LR

Longest Wavelength (λL + 10): 1500 nm
Period/Wavelength (Λ/(λL + 10)): 0.40
Incidence Angle θ1: 60°
Emergence Angle θ2: −53.2°
P-Polarized Light Reflection Diffraction Efficiency: 0.83 (−1.62 dB)
S-Polarized Light Reflection Diffraction Efficiency: 0.91 (−0.79 dB)
Mean Reflection Diffraction Efficiency: 0.87 (−1.20 dB)

The diffraction grating 52 does not produce diffraction in the light beam LT, and thus does not cause any variation in reflection angle even at the shortest or longest wavelength of the wavelength band thereof. Moreover, as will be clearly understood from Tables 3-2 and 3-3, high reflectivity is obtained even at the shortest and longest wavelengths.

Fourth Embodiment

Figure 6:
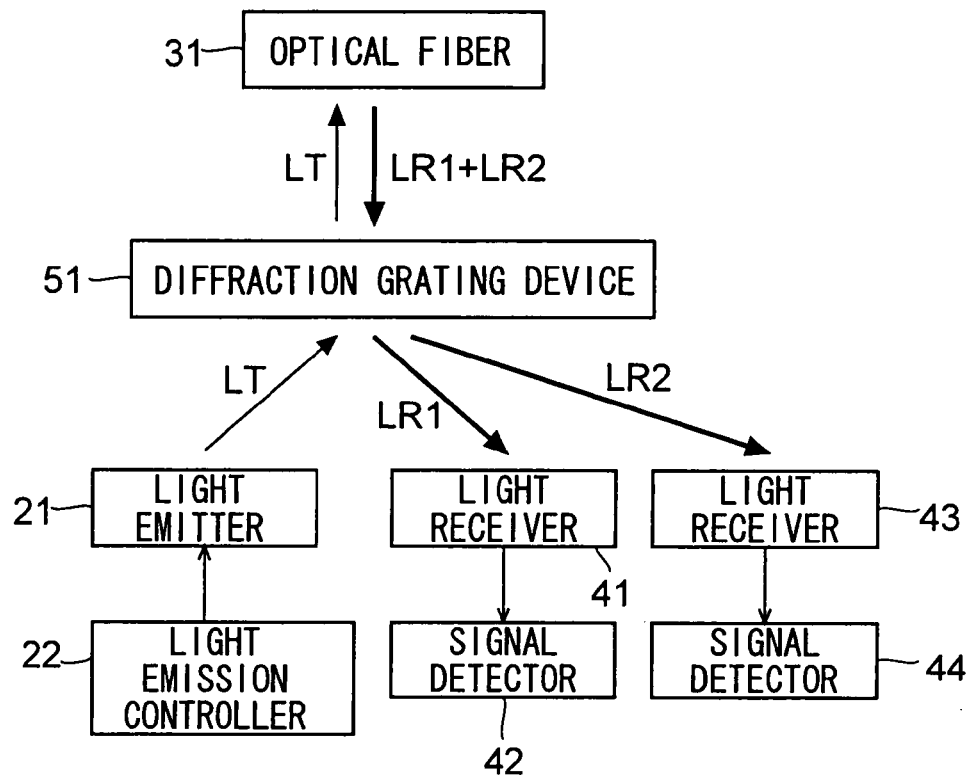
FIG. 6 is a diagram schematically showing the construction of the optical apparatus of a fourth embodiment of the invention.

FIG. 6 schematically shows the construction of the optical apparatus 4 of a fourth embodiment of the invention. This optical apparatus 4, too, is, like the optical apparatuses 1 to 3 of the first to third embodiments, a transmitter/receiver apparatus, but, unlike them, receives two light beams LR1 and LR2 in different wavelength bands via an optical fiber 31. Accordingly, the optical apparatus 4 includes, in addition to a light emitter 21, a light emission controller 22, an optical fiber 31, a light receiver 41, a signal detector 42, and a diffraction grating device 51 like those described previously, a light receiver 43 and a signal detector 44. Thus, the diffraction grating device 51 receives, as the targets that it diffracts, three light beams in total, namely the transmitted light beam LT and the received light beams LR1 and LR2. Of these light beams, the light beam LT has the shortest wavelength, the light beam LR2 has the longest wavelength, and the light beam LR1 has the middle wavelength.

Now, the design of the diffraction grating 52 formed on the diffraction grating device 51 in the optical apparatus 4 will be described. Here, it is assumed that the period of the elevations and depressions of the diffraction grating 52 is Λ; that the height difference between the elevations and depressions of the diffraction grating 52 is h; that, of the two media between which the diffraction grating 52 is sandwiched, the one present on the side thereof on which the light beam LT is incident has a refractive index of n1 and the other has a refractive index of n2; that the incidence angle at which the light beam is incident on the diffraction grating 52 is θ1; the emergence angle at which the light beam emerges from the diffraction grating 52 is θ2; that the center wavelength of the light beam LT having the shortest wavelength is λS; that the center wavelength of the light beam LR2 having the longest wavelength is λL; and that the center wavelength of the light beam LR1 having the middle wavelength is λM.

The diffraction grating 52 fulfills the relationships (D1) to (D3) below.

$$n2 < n1 \cdot \sin\theta1 \tag{D1}$$

$$1/(n1 + n1 \cdot \sin\theta1) \leq \Lambda/\lambda L \leq 1/(n2 + n1 \cdot \sin\theta1) \tag{D2}$$

$$1/(n1 + n1 \cdot \sin\theta1) \leq \Lambda/\lambda M \leq 1/(n2 + n1 \cdot \sin\theta1) \tag{D2a}$$

$$1/(n2 + n1 \cdot \sin\theta1) \leq \Lambda/\lambda S \leq 2/(n1 + n1 \cdot \sin\theta1) \tag{D3}$$

Fulfilling these relationships, the diffraction grating 52 reflects, by diffraction of the minus first order, the light beam LR2 having the longest wavelength and the light beam LR1 having the middle wavelength, and reflects (regularly reflects), by diffraction of the zero order, the light beam LT having the shortest wavelength.

Figure 7:
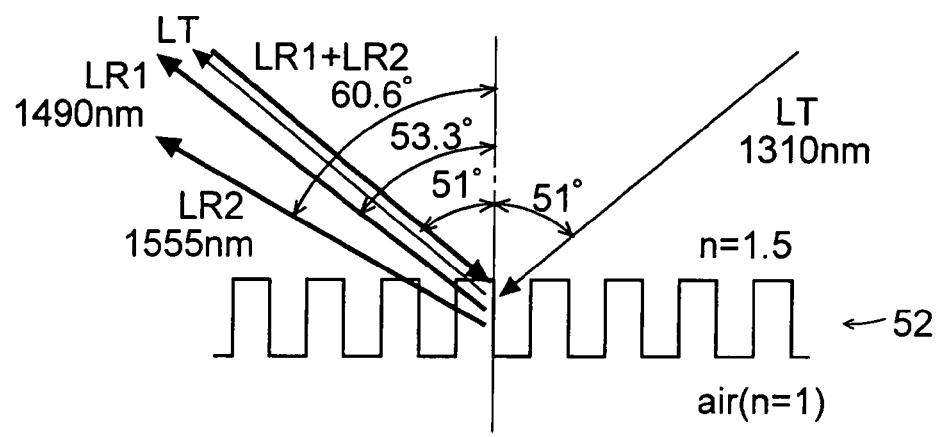
FIG. 7 is a diagram schematically showing the optical path in one practical example of the diffraction grating used in the optical apparatus of the fourth embodiment.

FIG. 7 schematically shows the optical path observed in one practical example. In this example, the center wavelength of the transmitted light beam LT is 1,310 nm, and the center wavelengths of the received light beams LR1 and LR2 are 1,490 nm and 1,555 nm, respectively; the light beams LT, LR1, and LR2 are made incident on the diffraction grating 52 from inside the diffraction grating device 51. The relevant parameters are listed in Table 4-1. Here, the incidence plane of the principal rays of the light beams LT, LR1, and LR2 is parallel to the direction of the period of the diffraction grating 52.

TABLE 4-1

Diffraction Grating 52

Sectional Shape: Rectangular
Elevation-Depression Period Λ: 0.629 μm
Elevation-Depression Height Difference h: 0.645 μm
Elevation Width: 0.239 μm
Medium Refractive Index: 1.5
Light Beam LT Wavelength (λS): 1310 nm
Incidence Angle θ1: 51°
Emergence Angle θ2: 51°
Reflectivity: 0.76 (−2.41 dB)
Light Beam LR1

Wavelength (λM): 1490 nm
Incidence Angle θ1: 51°
Emergence Angle θ2: −53.3°
P-Polarized Light Reflection Diffraction Efficiency: 0.95 (−0.44 dB)
S-Polarized Light Reflection Diffraction Efficiency: 0.85 (−1.45 dB)
Mean Reflection Diffraction Efficiency: 0.90 (−0.93 dB)
Light Beam LR2

Wavelength (λM): 1555 nm
Incidence Angle θ1: 51°
Emergence Angle θ2: −60.6°
P-Polarized Light Reflection Diffraction Efficiency: 0.76 (−2.34 dB)
S-Polarized Light Reflection Diffraction Efficiency: 0.75 (−2.45 dB)
Mean Reflection Diffraction Efficiency: 0.76 (−2.39 dB)

In Table 4-1, the elevation width of the diffraction grating 52 denotes the width of each of the parts thereof that are elevated toward the side at which the light beams LT, LR1, and LR2 are incident (i.e., toward the inside of the diffraction grating device 51).

The reflectivity of the light beams LR1 and LR2, which are reflected by diffraction of the minus first order, is increased by setting the center lengths λM and λL thereof within the ranges defined by formulae (D2a and D2), and the reflectivity of the light beam LT, which is reflected by diffraction of the zero order, is increased by setting the center length λS thereof within the range defined by formula (D3). Here, the value of 1/(1.5+1.5·sin 51°) is 0.375, the value of 1/(1+1.5·sin 51°) is 0.462, and the value of 2/(1.5+1.5·sin 51°) is 0.750.

Also in this embodiment, as in the third embodiment, the diffraction grating 52 produces diffraction of the zero order, i.e., no diffraction, in the light beam LT. This prevents the light beam LT from diverging, and makes it easy to make the entire light beam LT enter the thin optical fiber 31.

The parameters related to the light beam LT as observed when the wavelength band of the light beam LT has a width of ±50 nm around wavelength λS are listed in Tables 4-2 and 4-3. The parameters related to the light beam LR1 as observed when the wavelength band of the light beam LR1 has a width of ±10 nm around wavelength λM are listed in Tables 4-4 and 4-5. The parameters related to the light beam LR2 as observed when the wavelength band of the light beam LR2 has a width of ±5 nm around wavelength λL are listed in Tables 4-6 and 4-7. The parameters other than those listed in these tables are the same as in Table 4-1.

TABLE 4-2

Light Beam LT

Shortest Wavelength (λS − 50): 1260 nm
Incidence Angle θ1: 51°
Emergence Angle θ2: 51°
Reflectivity: 0.87 (−1.26 dB)

TABLE 4-3

Light Beam LT

Longest Wavelength (λS + 50): 1360 nm
Incidence Angle θ1: 51°
Emergence Angle θ2: 51°
Reflectivity: 0.74 (−2.64 dB)

TABLE 4-4

Light Beam LR1

Shortest Wavelength (λM − 10): 1480 nm
Incidence Angle θ1: 51°
Emergence Angle θ2: −52.3°
P-Polarized Light Reflection Diffraction Efficiency: 0.96 (−0.33 dB)
S-Polarized Light Reflection Diffraction Efficiency: 0.84 (−1.52 dB)
Mean Reflection Diffraction Efficiency: 0.90 (−0.90 dB)

TABLE 4-5

Light Beam LR1

Longest Wavelength (λM + 10): 1500 nm
Incidence Angle θ1: 51°
Emergence Angle θ2: −54.4°
P-Polarized Light Reflection Diffraction Efficiency: 0.93 (−0.60 dB)
S-Polarized Light Reflection Diffraction Efficiency: 0.85 (−1.45 dB)
Mean Reflection Diffraction Efficiency: 0.89 (−1.02 dB)

TABLE 4-6

Light Beam LR2

Shortest Wavelength (λL − 5): 1550 nm
Incidence Angle θ1: 51°
Emergence Angle θ2: −60°
P-Polarized Light Reflection Diffraction Efficiency: 0.78 (−2.12 dB)
S-Polarized Light Reflection Diffraction Efficiency: 0.77 (−2.30 dB)
Mean Reflection Diffraction Efficiency: 0.78 (−2.21 dB)

TABLE 4-7

Light Beam LR2

Longest Wavelength (λL + 5): 1560 nm
Incidence Angle θ1: 51°
Emergence Angle θ2: −61.2°
P-Polarized Light Reflection Diffraction Efficiency: 0.74 (−2.56 dB)
S-Polarized Light Reflection Diffraction Efficiency: 0.74 (−2.62 dB)
Mean Reflection Diffraction Efficiency: 0.74 (−2.59 dB)

The diffraction grating 52 does not produce diffraction in the light beam LT, and thus does not cause any variation in reflection angle even at the shortest or longest wavelength of the wavelength band thereof. Moreover, as will be clearly understood from Tables 4-2 and 4-3, high reflectivity is obtained even at the shortest and longest wavelengths.

Fifth Embodiment

The optical apparatus 5 of this embodiment, too, is for use in optical communication, and has a construction similar to that of the optical apparatus 1 shown in FIG. 1. Specifically, the optical apparatus 5 includes a light emitter 21, a light emission controller 22, an optical fiber 31, a light receiver 41, a signal detector 42, and a diffraction grating device 51.

Now, the design of the diffraction grating 52 formed on the diffraction grating device 51 in the optical apparatus 5 will be described. Here, as in the first embodiment, it is assumed that the period of the elevations and depressions of the diffraction grating 52 is Λ; that the height difference between the elevations and depressions of the diffraction grating 52 is h; that, of the two media between which the diffraction grating 52 is sandwiched, the one present on the side thereof on which the light beam LT is incident has a refractive index of n1 and the other has a refractive index of n2; that the incidence angle at which the light beam is incident on the diffraction grating 52 is θ1; the emergence angle at which the light beam emerges from the diffraction grating 52 is θ2; that the center wavelength of the light beam LT having the shorter wavelength is λS; and that the center wavelength of the light beam LR having the longer wavelength is λL.

The diffraction grating 52 fulfills the relationships (E1) to (E3) below.

$$n2 \geq n1 \cdot \sin \theta 1 \quad \text{(E1)}$$

$$\Lambda/\lambda L \leq 1/(n2 + n1 \cdot \sin \theta 1) \quad \text{(E2)}$$

$$1/(n2 + n1 \cdot \sin \theta 1) - 0.04 < \Lambda/\lambda S < 1/(n2 + n1 \cdot \sin \theta 1) + 0.02 \quad \text{(E3)}$$

Fulfilling these relationships, the diffraction grating 52 transmits, by diffraction of the zero order, the light beam LR having the longer wavelength, and reflects (regularly reflects), by diffraction of the zero order, the light beam LT having the shorter wavelength.

Figure 8:
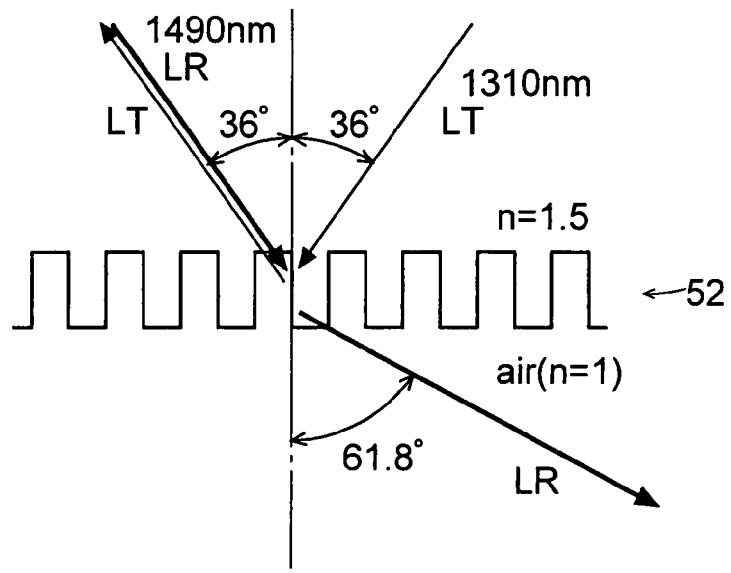
FIG. 8 is a diagram schematically showing the optical path in one practical example of the diffraction grating used in the optical apparatus of a fifth embodiment of the invention.

FIG. 8 schematically shows the optical path observed in one practical example. In this example, the center wavelength of the transmitted light beam LT is 1,310 nm, and the center wavelength of the received light beam LR is 1,490 nm; the light beams LT and LR are made incident on the diffraction grating 52 from inside the diffraction grating device 51. The relevant parameters are listed in Table 5-1. Here, the incidence plane of the principal rays of the light beams LT and LR is parallel to the direction of the period of the diffraction grating 52.

TABLE 5-1

Diffraction Grating 52

Sectional Shape: Rectangular
Elevation-Depression Period Λ: 0.667 μm
Elevation-Depression Height Difference h: 1.167 μm
Elevation Width: 0.267 μm
Medium Refractive Index: 1.5
Light Beam LT Wavelength (λS): 1310 nm
Period/Wavelength (Λ/λS): 0.509
Incidence Angle θ1: 36°
Emergence Angle θ2: 36°
Reflectivity: 0.71 (−2.93 dB)
Light Beam LR Wavelength (λL): 1490 nm
Period/Wavelength (Λ/λL): 0.448
Incidence Angle θ1: 36°
Emergence Angle θ2: 61.8°
P-Polarized Light Transmissivity: 0.91 (−0.86 dB)
S-Polarized Light Transmissivity: 0.76 (−2.34 dB)
Mean Transmissivity: 0.83 (−1.57 dB)

In Table 5-1, the elevation width of the diffraction grating 52 denotes the width of each of the parts thereof that are elevated toward the side at which the light beams LT and LR are incident (i.e., toward the inside of the diffraction grating device 51).

Figure 9:
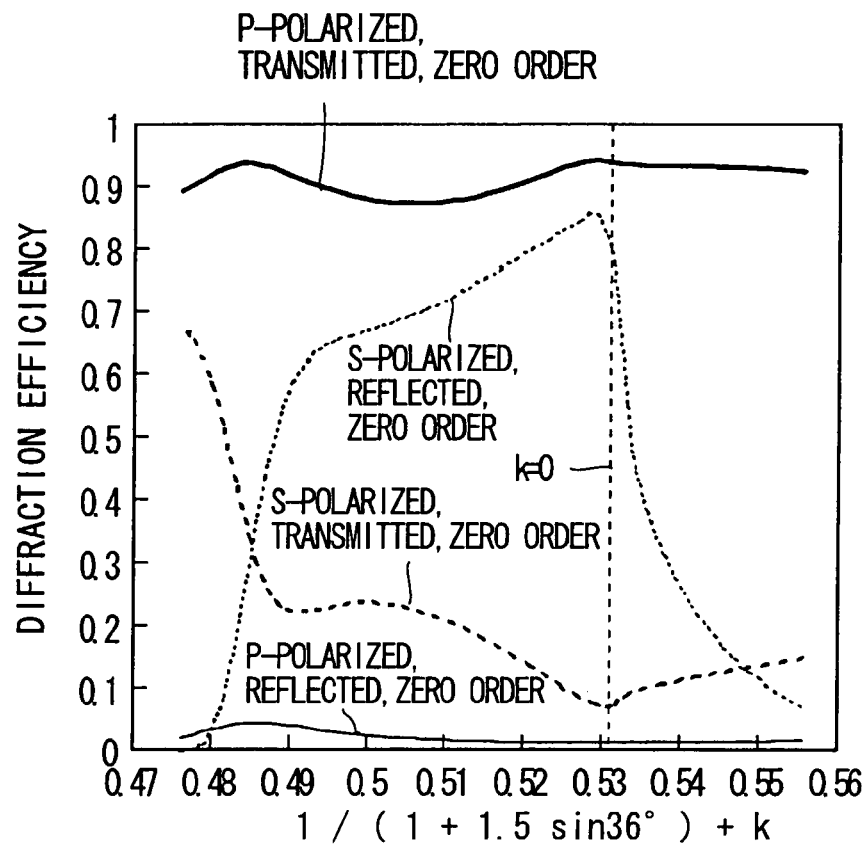
FIG. 9 is a diagram showing the relationship between the variation of the parameters of the diffraction grating and the variation of the diffraction efficiency in the optical apparatus of the fifth embodiment.

FIG. 9 shows how the diffraction efficiency varies as the value of $1/(n2+n1 \cdot \sin \theta1)$, appearing in formulae (E2) and (E3), varies in the practical example (n1=1.5, n2=1, and θ1=36°) described above. Here, the value of $1/(1+1.5 \cdot \sin 36°)$ is 0.531. As will be understood from FIG. 9, the transmissivity of the light beam LR, which is transmitted by diffraction of the zero order, is increased by setting the center length λL thereof within the range defined by formula (E2), and the reflectivity of the light beam LT, which is reflected by diffraction of the zero order, is increased by setting the center length λS thereof within the range defined by formula (E3).

In the optical apparatus 5, the diffraction grating 52 produces diffraction of the zero order, i.e., no diffraction, in both the light beams LT and LR. This prevents the light beams LT and LR from diverging, and makes it easy to make the entire light beam LT enter the thin optical fiber 31 and to make the entire light beam LR enter the small light receiver 41.

The parameters related to the light beam LT as observed when the wavelength band of the light beam LT has a width of ±50 nm around wavelength λS are listed in Tables 5-2 and 5-3. The parameters related to the light beam LR as observed when the wavelength band of the light beam LR has a width of ±10 nm around wavelength λL are listed in Tables 5-4 and 5-5. The parameters other than those listed in these tables are the same as in Table 5-1.

TABLE 5-2

Light Beam LT

Shortest Wavelength (λS − 50): 1260 nm
Period/Wavelength (Λ/(λS − 50)): 0.529
Incidence Angle θ1: 36°
Emergence Angle θ2: 36°
Reflectivity: 0.85 (−1.39 dB)

TABLE 5-3

Light Beam LT

Longest Wavelength (λS + 50): 1360 nm
Period/Wavelength (Λ/(λS + 50)): 0.490
Incidence Angle θ1: 36°
Emergence Angle θ2: 36°
Reflectivity: 0.59 (−4.65 dB)

TABLE 5-4

Light Beam LR

Shortest Wavelength (λL − 10): 1480 nm
Period/Wavelength (Λ/(λL − 10)): 0.451
Incidence Angle θ1: 36°
Emergence Angle θ2: 61.8°
P-Polarized Light Transmissivity: 0.90 (−0.92 dB)
S-Polarized Light Transmissivity: 0.76 (−2.44 dB)
Mean Transmissivity: 0.83 (−1.64 dB)

TABLE 5-5

Light Beam LR

Longest Wavelength (λL + 10): 1500 nm
Period/Wavelength (Λ/(λL + 10)): 0.445
Incidence Angle θ1: 36°
Emergence Angle θ2: 61.8°
P-Polarized Light Transmissivity: 0.91 (−0.80 dB)
S-Polarized Light Transmissivity: 0.77 (−2.25 dB)
Mean Transmissivity: 0.84 (−1.50 dB)

The diffraction grating 52 does not produce diffraction in the light beams LT and LR, and thus does not cause any variation in emergence angle even at the shortest or longest wavelength of the wavelength bands thereof. Moreover, high reflectivity or transmissivity is obtained even at the shortest and longest wavelengths of those wavelength bands.

Sixth Embodiment

Figure 10:
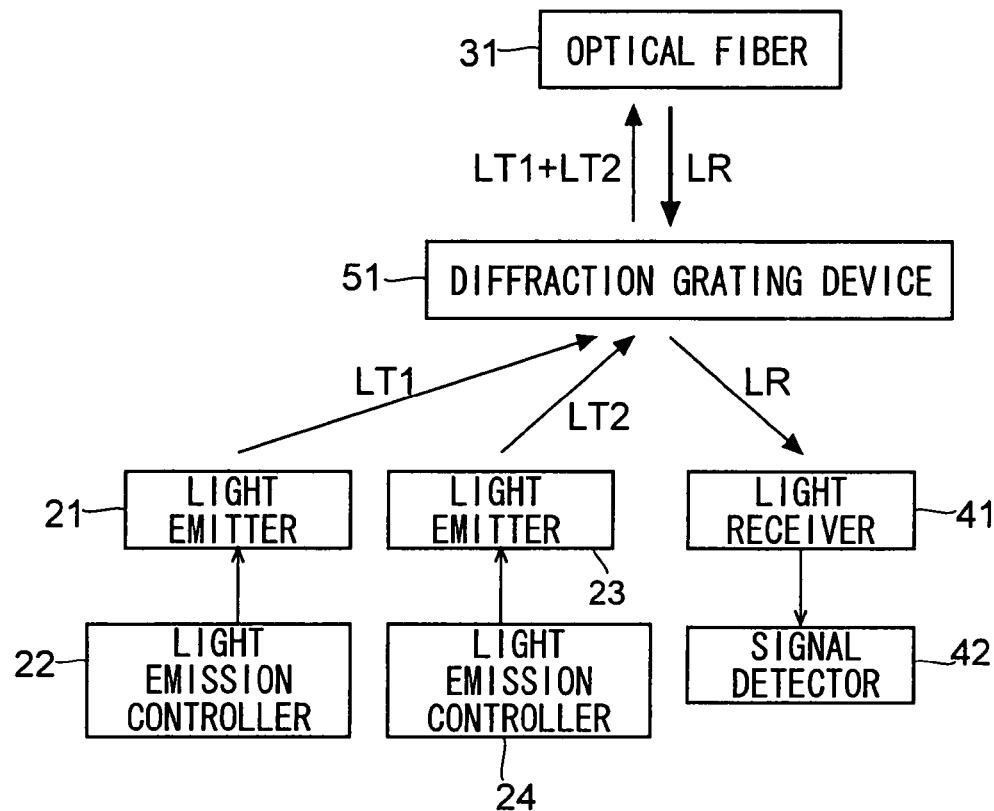
FIG. 10 is a diagram schematically showing the construction of the optical apparatus of a sixth embodiment of the invention.

FIG. 10 schematically shows the construction of the optical apparatus 6 of a sixth embodiment of the invention. This optical apparatus 6, too, is, like the optical apparatus 5 of the fifth embodiment, a transmitter/receiver apparatus, but, unlike it, transmits two light beams LT1 and LT2 in different wavelength bands via an optical fiber 31. Accordingly, the optical apparatus 6 includes, in addition to a light emitter 21, a light emission controller 22, an optical fiber 31, a light receiver 41, a signal detector 42, and a diffraction grating device 51 like those described previously, a light emitter 23 and a light emission controller 24. Thus, the diffraction grating device 51 receives, as the targets that it diffracts, three light beams in total, namely the transmitted light beams LT1 and LT2 and the received light beam LR. Of these light beams, the light beam LT1 has the shortest wavelength, the light beam LR has the longest wavelength, and the light beam LT2 has the middle wavelength.

Now, the design of the diffraction grating 52 formed on the diffraction grating device 51 in the optical apparatus 6 will be described. Here, it is assumed that the period of the elevations and depressions of the diffraction grating 52 is $\Lambda$; that the height difference between the elevations and depressions of the diffraction grating 52 is h; that, of the two media between which the diffraction grating 52 is sandwiched, the one present on the side thereof on which the light beam LT is incident has a refractive index of n1 and the other has a refractive index of n2; that the incidence angle at which the light beam is incident on the diffraction grating 52 is $\theta 1$; the emergence angle at which the light beam emerges from the diffraction grating 52 is $\theta 2$; that the center wavelength of the light beam LT1 having the shortest wavelength is $\lambda S$; that the center wavelength of the light beam LR having the longest wavelength is $\lambda L$; and that the center wavelength of the light beam LT2 having the middle wavelength is $\lambda M$.

The diffraction grating 52 fulfills the relationships (F1) to (F4) below.

$$n2 \geq n1 \cdot \sin \theta 1 \tag{F1}$$

$$\Lambda/\lambda L \leq 1/(n2 + n1 \cdot \sin \theta 1) \tag{F2}$$

$$1/(n2 + n2 \cdot \sin \theta 1) - 0.04 < \Lambda/\lambda M < 1/(n2 + n1 \cdot \sin \theta 1) + 0.02 \tag{F3}$$

$$\Lambda/\lambda S \geq 1/(n2 + n1 \cdot \sin \theta 1) \tag{F4}$$

With this design, the diffraction grating 52 transmits, by diffraction of the zero order, the light beam LR having the longest wavelength and the light beam LT1 having the shortest wavelength, and reflects (regularly reflects), by diffraction of the zero order, the light beam LT2 having the middle wavelength.

Seventh Embodiment

Figure 11:
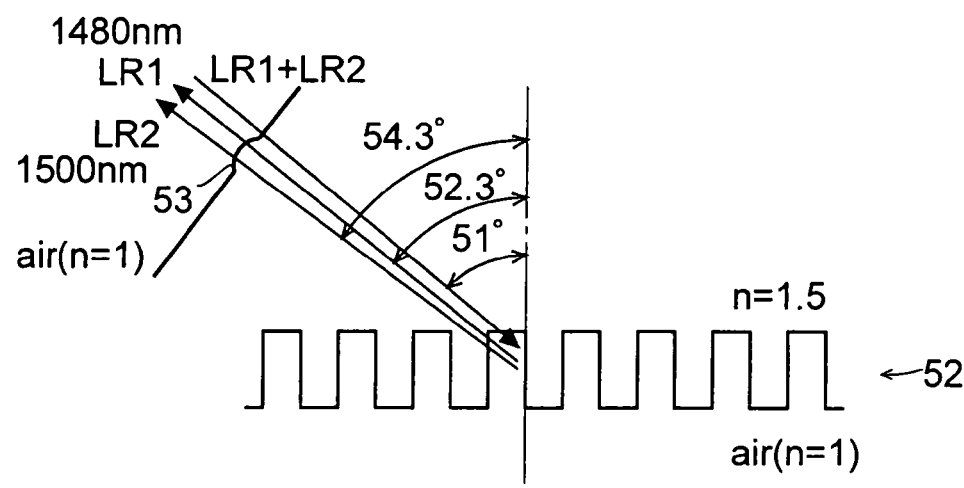
FIG. 11 is a diagram schematically showing the construction of the optical apparatus of a seventh embodiment of the invention.

The optical apparatus 7 of this embodiment is a modified version of the optical apparatus 4 of the fourth embodiment, which receives two light beams LR1 and LR2 in different wavelength bands via an optical fiber 31. FIG. 11 shows the diffraction grating device 51 used in the optical apparatus 7 and the optical path of the light beams LR1 and LR2. Of the surface of the diffraction grating device 51 other than where the diffraction grating 52 is formed, the part 53 through which the light beams LR1 and LR2 pass after diffraction is formed into a curved surface in the shape of a cylinder of which the center line is perpendicular to the direction of the period of the diffraction grating 52. Thus, this part 53 acts as a convex lens with respect to the light beams LR1 and LR2.

Since the light beams LR1 and LR2 are diffracted light, they diverge according to the width of the wavelength bands thereof. By giving a light-condensing function to the part 53 through which they pass in this way, however, it is possible to turn the light beams LR1 and LR2 into closely parallel or even converging light beams. This makes it possible to make the entire light beams LR1 and LR2 enter the light receivers 41 and 42 without making the light receivers 41 and 42 large. Moreover, by giving the part 53 an appropriately curved shape, it is possible to reduce aberrations.

If the radius of curvature of the part 53, which has a curved surface, is made equal to the distance from the point at which the light beams are incident on the diffraction grating 52 to the part 53, then the part 53 do not have a light-condensing function. Even then, it is possible to prevent the light beams LR1 and LR2 from further diverging as a result of refraction as is the case if the part 53 has a flat surface.

In this embodiment, it is assumed that the center wavelength $\lambda M$ of the light beam LR1 is 1,480 nm; that the center wavelength $\lambda L$ of the light beam LR2 is 1,500 nm; that the incidence angle $\theta 1$ of the light beams LR1 and LR2 is 51°; that the reflection angle $\theta 2$ of the light beam LR1 is 52.3°; and that the reflection angle $\theta 2$ of the light beam LR2 is 54.3°. Though not illustrated, the incidence angle of the transmitted light beam LT is 55.4° when the center wavelength $\lambda S$ thereof is 1,260 nm, 51.8° when the center wavelength $\lambda S$ thereof is 1,310 nm, and 48.39° when the center wavelength $\lambda S$ thereof is 1,360 nm.

Eighth Embodiment

Figure 12:
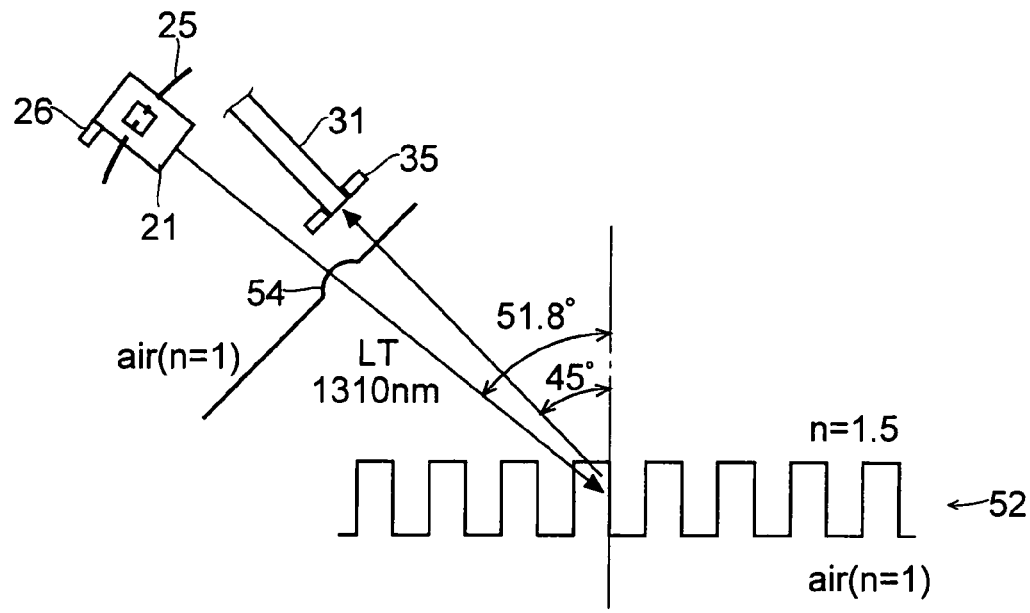
FIG. 12 is a diagram schematically showing the construction of the optical apparatus of an eighth embodiment of the invention.

The optical apparatus 8 of this embodiment is a modified version of the optical apparatus 2 of the second embodiment, which reflects, by diffraction of the minus first order, the transmitted light beam LT. FIG. 12 shows the diffraction grating device 51 used in the optical apparatus 8 and the optical path of the light beam LT. Of the surface of the diffraction grating device 51 elsewhere than where the diffraction grating 52 is formed, the part 54 through which the light beam LT passes before incidence is formed into a curved surface in the shape of a cylinder of which the center line is perpendicular to the direction of the period of the diffraction grating 52. Thus, this part 54 acts as a convex lens with respect to the light beam LT. Even in a case where the light beam LT from the light emitter 21 is divergent, by giving a light-condensing function to the part 54 in this way, it is possible to turn the light beam LT incident on the diffraction grating 52 into a closely parallel light beam.

The optical apparatus 8 further includes an arc-shaped rail 25. This rail 25 runs about the point at which the light beam LT is incident on the diffraction grating 52, and is laid on the plane perpendicular to the diffraction grating 52 and parallel to the direction of the period thereof. The light emitter 21 is movable along the rail 25 so that, as the light emitter 21 moves, the incidence angle at which the light beam LT is incident on the diffraction grating 52 varies. Moreover, the light emitter 21 is fitted with a temperature sensor 26 so that the position of the light emitter 21 is controlled according to the temperature detected by the temperature sensor 26.

The characteristics of the laser diode provided in the light emitter 21 that emits the light beam LT vary with temperature, and accordingly the wavelength of the light beam LT varies with temperature. As the wavelength varies, the diffraction angle at which the light beam LT is diffracted by the diffraction grating 52 varies, possibly causing part of the diffracted light beam LT to fail to enter the optical fiber 31. However, by varying the incidence angle of the light beam LT with respect to the diffraction grating 52 according to temperature in this way, it is possible to ensure that the entire light beam LT enters the optical fiber 31.

Instead of providing the temperature sensor 26, it is also possible to provide a plurality of optical sensors 35 near the end of the optical fiber 31 so that the position of the light emitter 21 is controlled according to which of the optical sensors 35 the light beam LT enters. In this case, by controlling the position of the light emitter 21 in such a way that the light beam LT enters none of the optical sensors 35, it is possible to make the entire light beam LT enter the optical fiber 31.

Here, the wavelengths of the light beams LT and LR, the design of the diffraction grating 52, and other relevant parameters are the same as in the second embodiment.

Ninth Embodiment

Figure 13A:
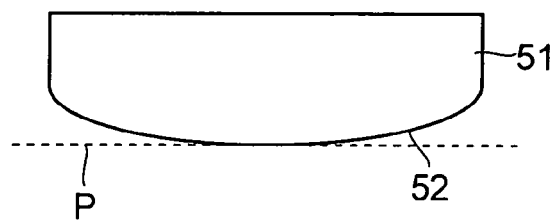
FIGS. 13A and 13B are a side view and a plan view, respectively, schematically showing the diffraction grating device used in the optical apparatus of a ninth embodiment of the invention.
Figure 13B:
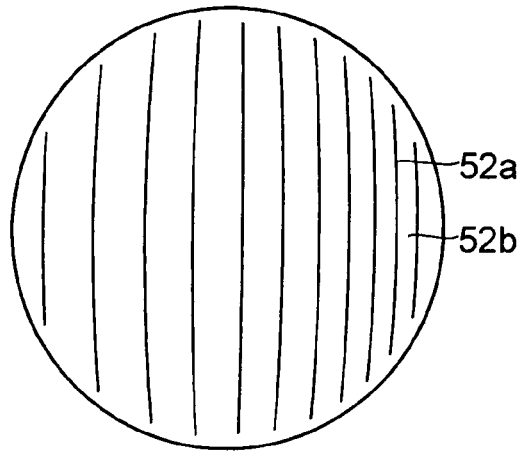

FIGS. 13A and 13B show the diffraction grating device 51 used in the optical apparatus 9 of this embodiment. FIG. 13A is a side view, and FIG. 13B is a plan view. In this embodiment, the surface of the diffraction grating device 51 is formed into a convex curved surface, and a diffraction grating 52 is formed on this curved surface. Forming the diffraction grating 52 on a curved surface permits the diffraction grating 52 to have an optical power resulting from refraction. This makes it possible to reduce the divergence of the emergent light beam, thereby eliminating the need to separately provide a means for reducing the divergence of the light beam after emergence.

In a case where the light beam incident on the diffraction grating 52 is not a parallel light beam, by making the intervals between the elevations and depressions of the diffraction grating 52 vary gradually instead of making them constant, or by forming the individual elevations and depressions in curved lines instead of forming them in straight lines, it is possible to reduce aberrations that cause the divergence of the light beam.

In a case where a diffraction grating 52 is formed on a curved surface as in this embodiment, at a given point on the diffraction grating 52, the diffraction grating 52 is projected onto the plane P tangent thereto at that point, and the incidence angle $\theta 1$ with respect to the plane P and the period $\Lambda$ as observed on the plane P are so chosen as to fulfill the relationships expressed by one of the groups of formulae (A1) to (A3), (B1) to (B3), (C1) to (C3), (D1) to (D3), (E1) to (E3), and (F1) to (F4). This makes it possible to obtain the same effects as obtained in the corresponding embodiment described previously.

Tenth Embodiment

Figure 14:
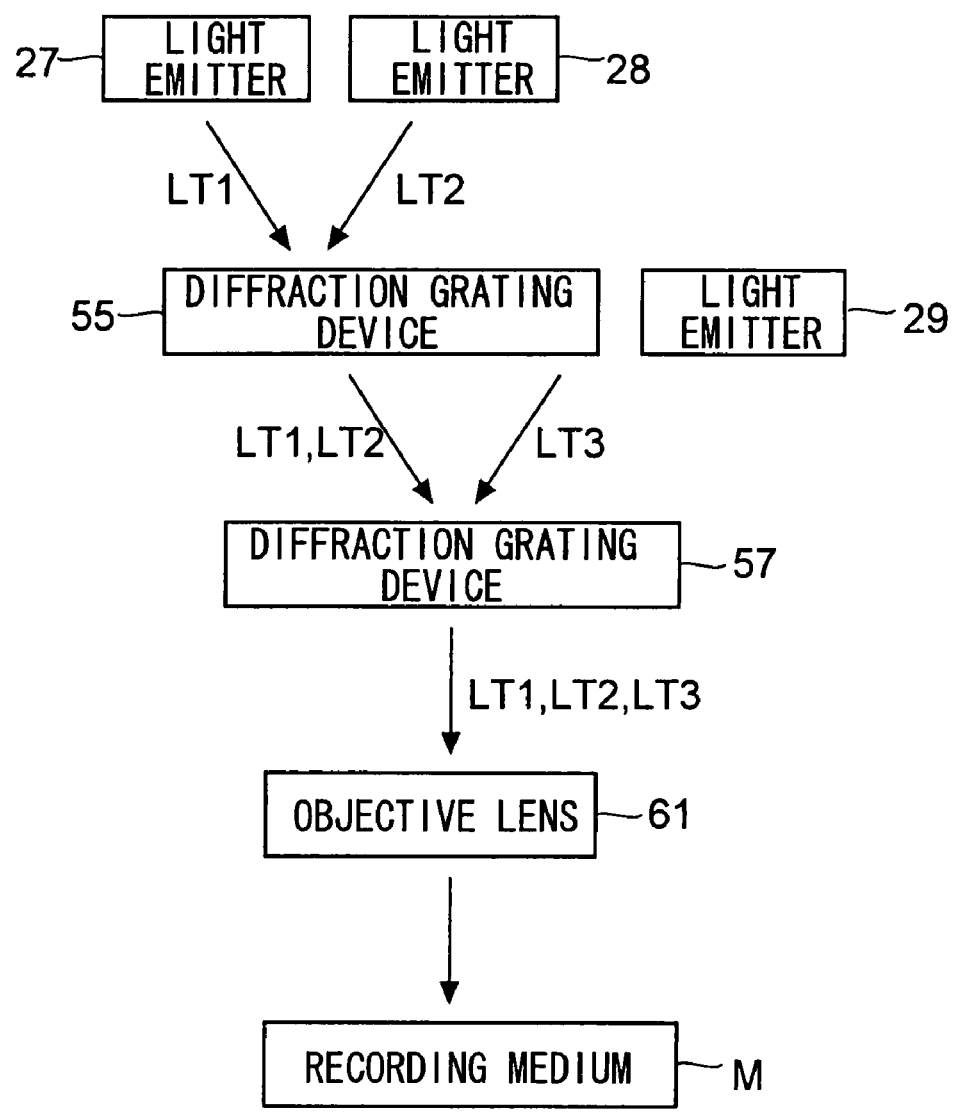
FIG. 14 is a diagram schematically showing the construction of the optical apparatus of a tenth embodiment of the invention.

FIG. 14 schematically shows the construction of the optical apparatus 10 of a tenth embodiment. The optical apparatus 10 is an optical recording/reproducing apparatus that records and reads information to and from a recording medium by using light. The optical apparatus 10 includes three light emitters 27, 28, and 29, two diffraction grating devices 55 and 57, and an objective lens 61. The diffraction grating devices 55 and 57 are both prism-shaped, and each have a diffraction grating 56 or 58, respectively (see FIG. 15), formed on one surface thereof.

The light emitters 27, 28, and 29 emit light beams LT1, LT2, and LT3, respectively, in different wavelength bands so that a recording medium M is irradiated with those light beams. The light emitters 27, 28, and 29 each include, though not illustrated, a laser diode and a condenser lens so as to emit a parallel light beam obtained by condensing with the condenser lens the light emitted by the laser diode.

The diffraction grating device 55 couples together the light beam LT1 from the light emitter 27 and the light beam LT2 from the light emitter 28. On the other hand, the diffraction grating device 57 couples together the light beams LT1 and LT2 as coupled together by the diffraction grating device 55 and the light beam LT3 from the light emitter 29.

The objective lens 61 makes the light beams LT1, LT2, and LT3 as coupled together by the diffraction grating device 55 converge on the recording medium M.

Now, the design of the diffraction gratings 56 and 58 formed on the diffraction grating devices 55 and 57 will be described. Here, it is assumed that the period of the elevations and depressions of the diffraction grating 56 or 58 is $\Lambda$; that the height difference between the elevations and depressions of the diffraction grating 56 or 58 is h; that, of the two media between which the diffraction grating 56 or 58 is sandwiched, the one present on the side thereof on which the light beam is incident has a refractive index of n1 and the other has a refractive index of n2; that the incidence angle at which the light beam is incident on the diffraction grating 56 or 58 is $\theta 1$; the emergence angle at which the light beam emerges from the diffraction grating 56 or 58 is $\theta 2$; and that, of the wavelength bands in which the light beams LT1, LT2, and LT3 lie, the one covering the shortest wavelengths has a center wavelength of $\lambda S$, the one covering the longest wavelengths has a center wavelength of $\lambda L$, and the one covering the middle wavelengths has a center wavelength of $\lambda M$. Here, it should be noted that, although the parameters of the diffraction grating 56 and those of the diffraction grating 58 are represented by common symbols, the diffraction gratings 56 and 58 have different values for each parameter (for example, the period $\Lambda$).

The diffraction gratings 56 and 58 each fulfill the relationships (G1) to (G4) below.

$$n2 \geq n1 \cdot \sin \theta 1 \quad (G1)$$

$$\Lambda/\lambda L \leq 1/(n2+n1 \cdot \sin \theta 1) \quad (G2)$$

$$\Lambda/\lambda M \approx 1/(n2+n1 \cdot \sin \theta 1) \quad (G3)$$

$$\Lambda/\lambda S \geq 1/(n2+n1 \cdot \sin \theta 1) \quad (G4)$$

Fulfilling these relationships, the diffraction gratings 56 and 58 transmit or reflect the light beams LT1, LT2, and LT3 while producing diffraction of the zero order, i.e., no diffraction, in any of them.

Figure 15:
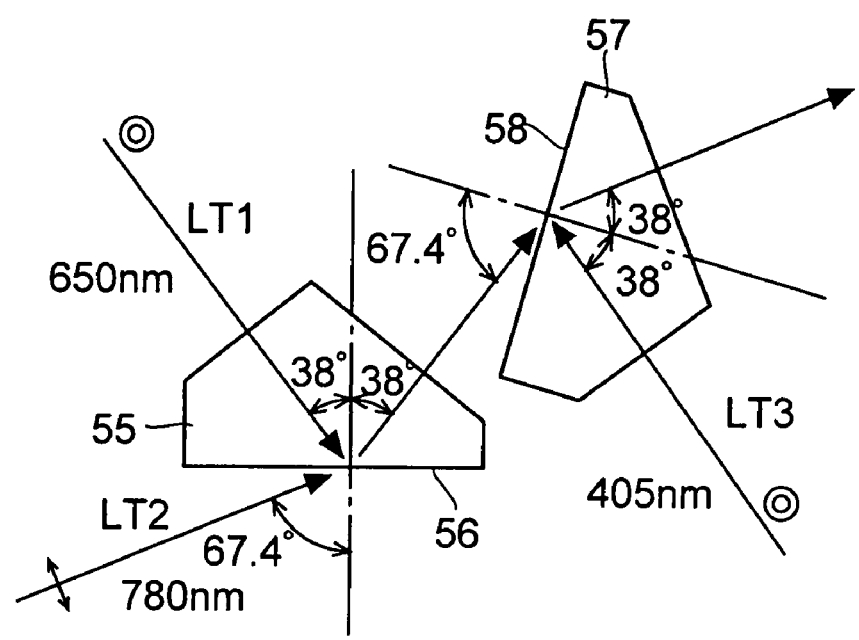
FIG. 15 is a diagram schematically showing the optical path in one practical example of the diffraction grating used in the optical apparatus of the tenth embodiment.

FIG. 15 schematically shows the optical path observed in one practical example. In this example, the center wavelengths of the wavelength bands of the light beams LT1, LT2, and LT3 are 650 nm, 780 nm, and 405 nm, respectively; the light beam LT1 is made incident on the diffraction grating 56 from inside the diffraction grating device 55, and the light beam LT2 is made incident on the diffraction grating 56 from the air side of the diffraction grating device 55; the light beams LT1 and LT2 are made incident on the diffraction grating 58 from the air side of the diffraction grating device 57, and the light beam LT3 is made incident on the diffraction grating 58 from inside the diffraction grating device 57. The relevant parameters are listed in Tables 6-1 and 6-2. In this example, the center wavelength of the light beam LT3 equals the shortest wavelength $\lambda S$, the center wavelength of the light beam LT2 equals the longest wavelength $\lambda L$, and the center wavelength of the light beam LT1 equals the middle wavelength $\lambda M$.

With respect to the diffraction gratings 56 and 58, the light beam LT1 is s-polarized, the light beam LT2 is p-polarized, and the light beam LT3 is s-polarized. In FIG. 15, a double-headed arrow on the optical path indicates that the polarization direction is parallel to the plane of the drawing, and a double circle on the optical path indicates that the polarization direction is perpendicular to the plane of the drawing.

TABLE 6-1

Diffraction Grating 56

Sectional Shape: Rectangular
Elevation-Depression Period Λ: 326 nm
Elevation-Depression Height Difference h: 571 nm
Elevation Width: 163 nm
Medium Refractive Index: 1.5
Light Beam LT1

Wavelength (λM): 650 nm
Period/Wavelength (Λ/λM): 0.502
Incidence Angle θ1: 38°
Emergence Angle θ2: 38°
S-Polarized Light Reflectivity: 0.962
Light Beam LT2

Wavelength (λL): 780 nm
Period/Wavelength (Λ/λL): 0.418
Incidence Angle θ1: 67.4°
Emergence Angle θ2: 38°
P-Polarized Light Transmissivity: 0.952

TABLE 6-2

Diffraction Grating 58

Sectional Shape: Rectangular
Elevation-Depression Period Λ: 203 nm
Elevation-Depression Height Difference h: 571 nm
Elevation Width: 163 nm
Medium Refractive Index: 1.5
Light Beam LT1

Wavelength (λM): 650 nm
Period/Wavelength (Λ/λM): 0.312
Incidence Angle θ1: 67.4°
Emergence Angle θ2: 38°
S-Polarized Light Transmissivity: 0.74
Light Beam LT2

Wavelength (λL): 780 nm
Period/Wavelength (Λ/λL): 0.260
Incidence Angle θ1: 67.4°
Emergence Angle θ2: 38°
P-Polarized Light Transmissivity: 0.944
Light Beam LT3

Wavelength (λS): 405 nm
Period/Wavelength (Λ/λS): 0.501
Incidence Angle θ1: 38°
Emergence Angle θ2: 38°
S-Polarized Light Reflectivity: 0.962

In Tables 6-1 and 6-2, the elevation width of the diffraction grating 56 or 58 denotes the width of each of the parts thereof that are elevated toward the inside of the diffraction grating device 55 or 57. The incidence angle at which the light beams LT1, LT2, and LT3 are incident on the surface of the diffraction grating devices 55 and 57 elsewhere than where the diffraction gratings 56 and 58 are formed is 90°. Assuming that the transmissivity through the surface elsewhere than where the diffraction gratings 56 and 58 are formed is 1, the amounts of light contained in the light beams LT1, LT2, and LT3 after they have passed through the diffraction grating devices 55 and 57 are respectively 0.712, 0.899, and 0.962 times the amounts of light contained in those light beams before they pass through the diffraction grating devices 55 and 57. Here, the value of 1/(1.5+sin 38°) is 0.520.

Eleventh Embodiment

The optical apparatus 11 of an eleventh embodiment of the invention is a transmitter/receiver apparatus for use in optical communication. This optical apparatus 11, like the optical apparatus 4 of the fourth embodiment shown in FIG. 6, transmits a light beam LT via an optical fiber 31, and receives two light beams LR1 and LR2 via the optical fiber 31. The light beams LT, LR1, and LR2 are in different wavelength bands.

Figure 16:
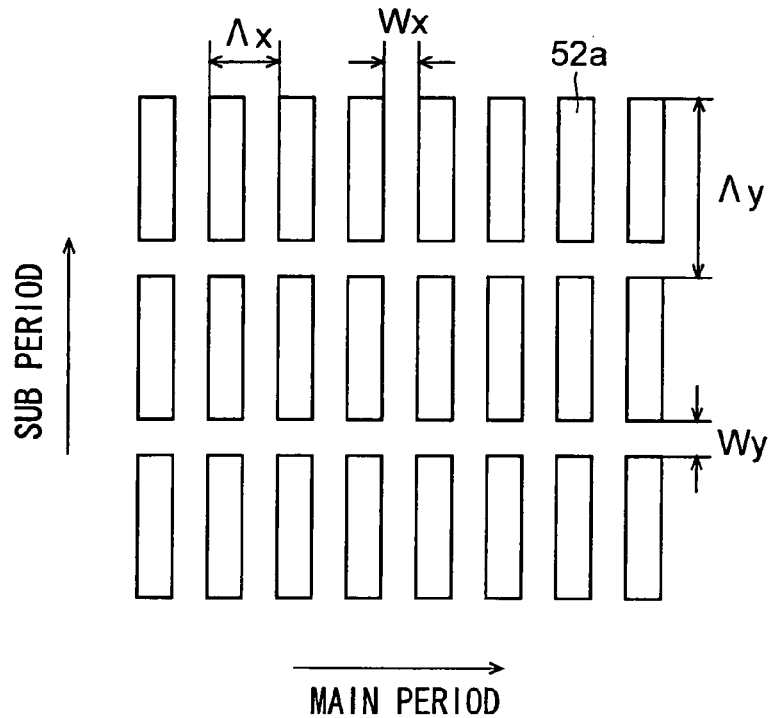
FIG. 16 is a plan view schematically showing the diffraction grating used in the optical apparatus of an eleventh embodiment of the invention.

Here, a diffraction grating 52 is formed on a diffraction grating device 51, and the elevations and depressions of the diffraction grating 52 have separate periods in a first and a second direction that are perpendicular to each other. FIG. 16 schematically shows the diffraction grating 52. The periods of the elevations and depressions in the first and second directions differ from each other, the period in the second direction being shorter. In the following description, the period in the first direction is referred to as the main period, and the period in the second direction is referred to as the sub period. Moreover, here, it is assumed that the main period is Λx and the sub period is Λy; and that the distance between the elevations 52a in the main period direction is Wx and the distance between the elevations 52a in the sub period direction is Wy.

Figure 17:
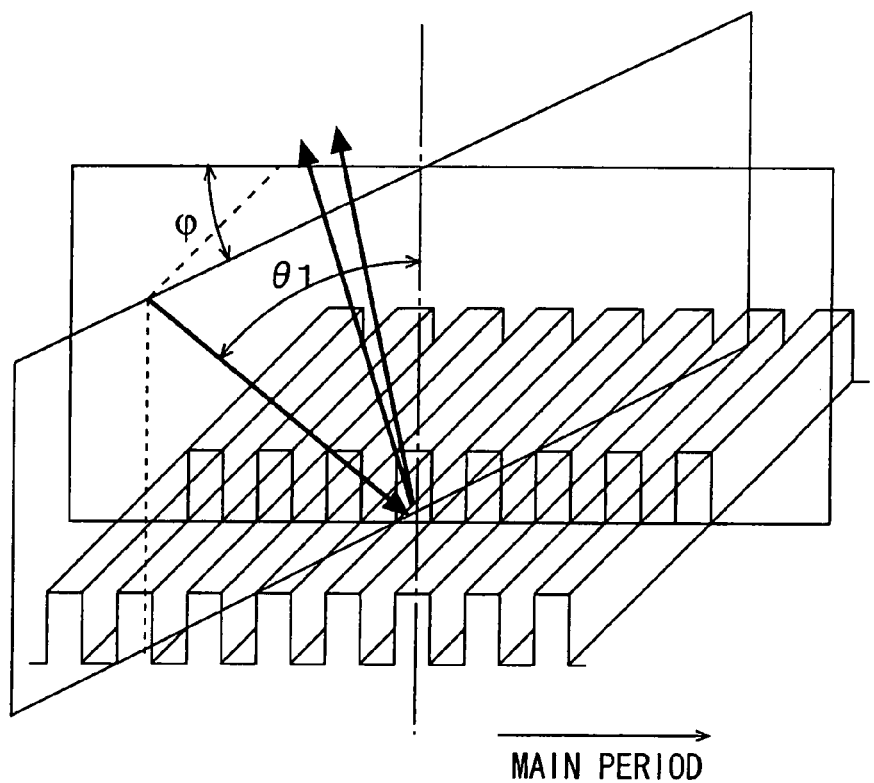
FIG. 17 is a perspective view schematically showing the relationship between the diffraction grating and the angles of the light beams in the eleventh embodiment.

FIG. 17 shows the relationship between the diffraction grating 52 and the angles of the light beams. The angle φ between the plane perpendicular to the diffraction grating 52 and parallel to the direction of the main period and the incidence plane of the light beams incident on the diffraction grating 52 is referred to as the direction angle. The incidence angle θ1 is the angle between the principal ray of the incident light beams and the normal to the diffraction grating 52 as measured in the incidence plane.

In the optical apparatus 11, the light beams LT, LR1, and LR2 are made incident on the diffraction grating 52 in such a way that the incidence planes of those light beams are slightly inclined relative to the direction of the main period. Thus, the direction angle of none of the light beams LT, LR1, and LR2 equals 0.

Now, the design of the diffraction grating 52 formed on the diffraction grating device 51 in the optical apparatus 11 will be described. Here, it is assumed that the main period (Λx) of the elevations and depressions of the diffraction grating 52 is Λ; that the height difference between the elevations and depressions of the diffraction grating 52 is h; that, of the two media between which the diffraction grating 52 is sandwiched, the one present on the side thereof on which the light beam is incident has a refractive index of n1 and the other has a refractive index of n2; that the incidence angle at which the light beam is incident on the diffraction grating 52 is θ1; the emergence angle at which the light beam emerges from the diffraction grating 52 is θ2; that, of the wavelength bands in which the light beams LT, LR1, and LR2 lie, the one covering the shortest wavelengths ranges from the shortest wavelength of λ1L to the longest wavelength of λ1U, the one covering the longest wavelengths ranges from the shortest wavelength of λ3L to the longest wavelength of λ3U, and the one covering the middle wavelengths ranges from the shortest wavelength of λ2L to the longest wavelength of λ2U.

The diffraction grating 52 fulfills the relationships (H1) to (H5) below.

$$\lambda 1L < \lambda 1U < \lambda 2L < \lambda 2U < \lambda 3L < \lambda 3U \quad (H1)$$

$$n2 < n1 \cdot \sin \theta 1 \quad (H2)$$

$$\phi \neq 0 \quad (H3)$$

$$1/[n1 \cdot (1-\sin^2 \theta 1 \cdot \sin^2 \phi)^{1/2} + n1 \cdot \sin \theta 1 \cdot \cos \phi] \leq \Lambda/$$
$$\lambda 3U < \Lambda/\lambda 2L \leq 1/[(n2^2 - n1^2 \cdot \sin^2 \theta 1 \cdot \sin^2 \phi)^{1/2} + n1 \cdot \sin \theta 1 \cdot \cos \phi] \quad (H4)$$

$$1/[(n2^2 - n1^2 \cdot \sin^2 \theta 1 \cdot \sin^2 \phi)^{1/2} + n1 \cdot \sin \theta 1 \cdot \cos \phi] \leq \Lambda/$$
$$\lambda 1U < \Lambda/\lambda 1L \leq 2/[n1 \cdot (1-\sin^2 \theta 1 \cdot \sin^2 \phi)^{1/2} + n1 \cdot \sin \theta 1 \cdot \cos \phi] \quad (H5)$$

Fulfilling these relationships, the diffraction grating 52 reflects (regularly reflects), by diffraction of the zero order, the transmitted light beam LT, and reflects, by diffraction of the minus first order, the two received light beams LR1 and LR2. The diffraction grating 52 and the light beams LR1 and LR2 fulfill a relationship close to the Littrow arrangement.

Figure 18:
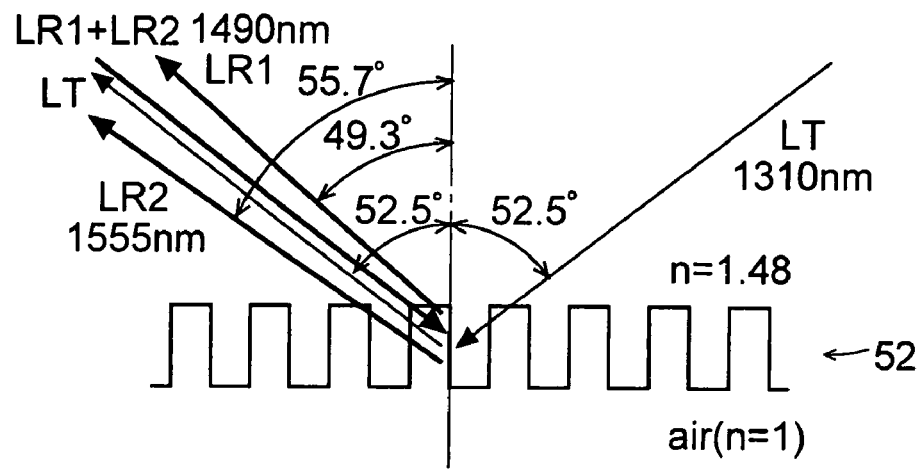
FIG. 18 is a diagram schematically showing the optical path in one practical example of the diffraction grating used in the optical apparatus of the eleventh embodiment.

FIG. 18 schematically shows the optical path observed in one practical example. In this example, the center wavelength of the transmitted light beam LT is 1,310 nm, and the center wavelengths of the received light beams LR1 and LR2 are 1,490 nm and 1,555 nm, respectively; the light beams LT, LR1, and LR2 are made incident on the diffraction grating 52 from inside the diffraction grating device 51. The relevant parameters are listed in Table 7-1. The direction angle (of the light beams LT, LR1, and LR2 is 10°.

TABLE 7-1

Diffraction Grating 52

Sectional Shape: Rectangular
Elevation-Depression Main Period Λx (Λ): 0.649 μm
Elevation-Depression Sub Period Λx: 1.298 μm
Elevation-Depression Height Difference h: 0.649 μm
Main-Period-Direction Elevation Width Wx: 0.389 μm
Sub-Period-Direction Elevation Width Wy: 0.13 μm
Medium Refractive Index: 1.48
Light Beam LT Wavelength (λS): 1310 nm
Period/Wavelength (Λx/λS): 0.495
Direction angle φ: 10°
Incidence Angle θ1: 52.5°
Emergence Angle θ2: 52.5°
Reflectivity: 0.77 (−1.14 dB)
Light Beam LR1

Wavelength (λM): 1490 nm
Period/Wavelength (Λx/λM): 0.436
Direction angle φ: 10°
Incidence Angle θ1: 52.5°
Emergence Angle θ2: −49.3°
P-Polarized Light Reflection Diffraction Efficiency: 0.92 (−0.35 dB)
S-Polarized Light Reflection Diffraction Efficiency: 0.95 (−0.22 dB)
Mean Reflection Diffraction Efficiency: 0.94 (−0.28 dB)
Light Beam LR2

Wavelength (λL): 1555 nm
Period/Wavelength (Λx/λL): 0.417
Direction angle φ: 10°
Incidence Angle θ1: 52.5°
Emergence Angle θ2: −55.7°
P-Polarized Light Reflection Diffraction Efficiency: 0.82 (−0.85 dB)
S-Polarized Light Reflection Diffraction Efficiency: 0.90 (−0.45 dB)
Mean Reflection Diffraction Efficiency: 0.86 (−0.64 dB)

In Table 7-1, the elevation width of the diffraction grating 52 denotes the width of each of the parts thereof that are elevated toward the side at which the light beams LT, LR1, and LR2 are incident (i.e., toward the inside of the diffraction grating device 51).

The parameters related to the shortest wavelength (λ1L) and the longest wavelength (λ1U) of the light beam LT as observed when the wavelength band thereof has a width of 100 nm are listed in Tables 7-2 and 7-3. The parameters related to the shortest wavelength (λ2L) and the longest wavelength (λ2U) of the light beam LR1 as observed when the wavelength band thereof has a width of 20 nm are listed in Tables 7-4 and 7-5. The parameters related to the shortest wavelength (λ3L) and the longest wavelength (λ3U) of the light beam LR2 as observed when the wavelength band thereof has a width of 10 nm are listed in Tables 7-6 and 7-7.

TABLE 7-2

Light Beam LT

Shortest Wavelength (λ1L): 1260 nm
Period/Wavelength (Λx/λ1L): 0.515
Direction angle φ: 10°
Incidence Angle θ1: 52.5°
Emergence Angle θ2: 52.5°
Reflectivity: 0.82 (−0.86 dB)

TABLE 7-3

Light Beam LT

Longest Wavelength (λ1U): 1360 nm
Period/Wavelength (Λx/λ1U): 0.477
Direction angle φ: 10°
Incidence Angle θ1: 52.5°
Emergence Angle θ2: 52.5°
Reflectivity: 0.72 (−1.46 dB)

TABLE 7-4

Light Beam LR1

Shortest Wavelength (λ2L): 1480 nm
Period/Wavelength (Λx/λ2L): 0.438
Direction angle φ: 10°
Incidence Angle θ1: 52.5°
Emergence Angle θ2: −48.4°
P-Polarized Light Reflection Diffraction Efficiency: 0.91 (−0.40 dB)
S-Polarized Light Reflection Diffraction Efficiency: 0.92 (−0.35 dB)
Mean Reflection Diffraction Efficiency: 0.92 (−0.37 dB)

TABLE 7-5

Light Beam LR1

Longest Wavelength (λ2U): 1500 nm
Period/Wavelength (Λx/λ2U): 0.433
Direction angle φ: 10°
Incidence Angle θ1: 52.5°
Emergence Angle θ2: −50.2°
P-Polarized Light Reflection Diffraction Efficiency: 0.93 (−0.34 dB)
S-Polarized Light Reflection Diffraction Efficiency: 0.96 (−0.16 dB)
Mean Reflection Diffraction Efficiency: 0.95 (−0.25 dB)

TABLE 7-6

Light Beam LR2

Shortest Wavelength (λ3L): 1550 nm
Period/Wavelength (Λx/λ3L): 0.419
Direction angle φ: 10°
Incidence Angle θ1: 52.5°
Emergence Angle θ2: −55.1°
P-Polarized Light Reflection Diffraction Efficiency: 0.84 (−0.77 dB)

TABLE 7-6-continued

Light Beam LR2

S-Polarized Light Reflection Diffraction Efficiency: 0.92 (−0.38 dB)
Mean Reflection Diffraction Efficiency: 0.88 (−0.57 dB)

TABLE 7-7

Light Beam LR2

Longest Wavelength (λ3U): 1560 nm
Period/Wavelength (Λx/λ3U): 0.416
Direction angle ϕ: 10°
Incidence Angle θ1: 52.5°
Emergence Angle θ2: −56.2°
P-Polarized Light Reflection Diffraction Efficiency: 0.81 (−0.94 dB)
S-Polarized Light Reflection Diffraction Efficiency: 0.89 (−0.52 dB)
Mean Reflection Diffraction Efficiency: 0.85 (−0.72 dB)

The values of the lower and upper limits of formula (H4), i.e., the values of the following two formulae equal 0.381 and 0.468, respectively, and the values of the periods of the light beams LR1 and LR2 divided by the wavelengths thereof fulfill formula (H4).

$$1/[n1 \cdot (1-\sin^2 \theta 1 \cdot \sin^2 \phi)^{1/2} + n1 \cdot \sin \theta 1 \cdot \cos \phi]$$

$$1/[(n2^2 - n1^2 \cdot \sin^2 \theta 1 \cdot \sin^2 \phi)^{1/2} + n1 \cdot \sin \theta 1 \cdot \cos \phi]$$

Moreover, the values of the lower and upper limits of formula (H5), i.e., the values of the following two formulae equal 0.468 and 0.763, respectively, and the value of the period of the light beam LT divided by the wavelength thereof fulfills formula (H5).

$$1/[(n2^2 - n1^2 \cdot \sin^2 \theta 1 \cdot \sin^2 \phi)^{1/2} + n1 \cdot \sin \theta 1 \cdot \cos \phi]$$

$$2/[n1 \cdot (1-\sin^2 \theta 1 \cdot \sin^2 \phi)^{1/2} + n1 \cdot \sin \theta 1 \cdot \cos \phi]$$

Fulfilling formula (H4) results in higher diffraction efficiency with the light beams LR1 and LR2 having the longer wavelengths that are reflected by diffraction of the minus first order. On the other hand, fulfilling formula (H5) results in higher reflection efficiency with the light beam LT having the shorter wavelength that is regularly reflected without diffraction.

In the optical apparatus of this embodiment, the diffraction grating 52 and the light beams LR1 and LR2 fulfill a relationship close to the Littrow arrangement. Nevertheless, since the direction angle ϕ is not 0, it is possible to alleviate the interference between the optical fiber 31 and the light receivers 41 and 43 (see FIG. 6), and this makes it easy to design the optical apparatus as a whole. However, if the direction angle ϕ is in the range from 0° to 0.5°, interference between the optical fiber 31 and the light receivers 41 and 43 is more likely. On the other hand, if the direction angle ϕ is more than 15°, an unduly large amount of light is diffracted at unnecessary orders. Thus, it is preferable that the direction angle ϕ be 0.5° or more but 15° or less.

For comparison, the parameters as observed when the direction angles ϕ of the light beams LT, LR1, and LR2 equal 0° are listed in Tables 8-1 to 8-7.

TABLE 8-1

Diffraction Grating

Sectional Shape: Rectangular
Elevation-Depression Main Period Λx (Λ): 0.649 μm

TABLE 8-1-continued

Elevation-Depression Sub Period Λx: 1.298 μm
Elevation-Depression Height Difference h: 0.649 μm
Main-Period-Direction Elevation Width Wx: 0.389 μm
Sub-Period-Direction Elevation Width Wy: 0.13 μm
Medium Refractive Index: 1.48
Light Beam LT Wavelength (λS): 1310 nm
Period/Wavelength (Λx/λS): 0.495
Direction angle ϕ: 0°
Incidence Angle θ1: 52.5°
Emergence Angle θ2: 52.5°
Reflectivity: 0.81 (−0.90 dB)
Light Beam LR1

Wavelength (λM): 1490 nm
Period/Wavelength (Λx/λM): 0.436
Direction angle ϕ: 0°
Incidence Angle θ1: 52.5°
Emergence Angle θ2: −49.3°
P-Polarized Light Reflection Diffraction Efficiency: 0.88 (−0.55 dB)
S-Polarized Light Reflection Diffraction Efficiency: 0.85 (−0.71 dB)
Mean Reflection Diffraction Efficiency: 0.86 (−0.63 dB)
Light Beam LR2

Wavelength (λL): 1555 nm
Period/Wavelength (Λx/λL): 0.417
Direction angle ϕ: 0°
Incidence Angle θ1: 52.5°
Emergence Angle θ2: −55.7°
P-Polarized Light Reflection Diffraction Efficiency: 0.87 (−0.59 dB)
S-Polarized Light Reflection Diffraction Efficiency: 0.95 (−0.23 dB)
Mean Reflection Diffraction Efficiency: 0.91 (−0.41 dB)

TABLE 8-2

Light Beam LT

Shortest Wavelength (λ1L): 1260 nm
Period/Wavelength (Λx/λ1L): 0.515
Direction angle ϕ: 0°
Incidence Angle θ1: 52.5°
Emergence Angle θ2: 52.5°
Reflectivity: 0.88 (−0.57 dB)

TABLE 8-3

Light Beam LT

Longest Wavelength (λ1U): 1360 nm
Period/Wavelength (Λx/λ1U): 0.477
Direction angle ϕ: 0°
Incidence Angle θ1: 52.5°
Emergence Angle θ2: 52.5°
Reflectivity: 0.76 (−1.21 dB)

TABLE 8-4

Light Beam LR1

Shortest Wavelength (λ2L): 1480 nm
Period/Wavelength (Λx/λ2L): 0.438
Direction angle ϕ: 0°
Incidence Angle θ1: 52.5°
Emergence Angle θ2: −48.4°
P-Polarized Light Reflection Diffraction Efficiency: 0.85 (−0.70 dB)
S-Polarized Light Reflection Diffraction Efficiency: 0.79 (−1.00 dB)
Mean Reflection Diffraction Efficiency: 0.82 (−0.85 dB)

TABLE 8-5

Light Beam LR1

Longest Wavelength (λ2U): 1500 nm
Period/Wavelength (Λx/λ2U): 0.433
Direction angle φ: 0°
Incidence Angle θ1: 52.5°
Emergence Angle θ2: −50.2°
P-Polarized Light Reflection Diffraction Efficiency: 0.90 (−0.45 dB)
S-Polarized Light Reflection Diffraction Efficiency: 0.89 (−0.50 dB)
Mean Reflection Diffraction Efficiency: 0.90 (−0.48 dB)

TABLE 8-6

Light Beam LR2

Shortest Wavelength (λ3L): 1550 nm
Period/Wavelength (Λx/λ3L): 0.419
Direction angle φ: 0°
Incidence Angle θ1: 52.5°
Emergence Angle θ2: −55.1°
P-Polarized Light Reflection Diffraction Efficiency: 0.88 (−0.53 dB)
S-Polarized Light Reflection Diffraction Efficiency: 0.95 (−0.21 dB)
Mean Reflection Diffraction Efficiency: 0.92 (−0.37 dB)

TABLE 8-7

Light Beam LR2

Longest Wavelength (λ3U): 1560 nm
Period/Wavelength (Λx/λ3U): 0.416
Direction angle φ: 0°
Incidence Angle θ1: 52.5°
Emergence Angle θ2: −56.2°
P-Polarized Light Reflection Diffraction Efficiency: 0.86 (−0.64 dB)
S-Polarized Light Reflection Diffraction Efficiency: 0.94 (−0.26 dB)
Mean Reflection Diffraction Efficiency: 0.90 (−0.45 dB)

The comparison of Tables 7-1 to 7-7 with Tables 8-1 to 8-7 shows that, even when the direction angle φ equals 10°, it is possible to obtain diffraction efficiency comparable with that obtained when the direction angle φ equals to 0°.

Now, a description will be given of the angle between the diffracted light beam and the main period direction. Assuming that the angle between the principal ray of the diffracted light beam as projected on the diffraction grating 52 and the main period direction is α, and that the wavelength is λ, it is necessary that the relationships expressed by formulae (J1) and (J2) be fulfilled. Moreover, where a relationship close to the Littrow arrangement is fulfilled as in this embodiment, formula (J3) holds.

$$[n1 \cdot \sin\theta1 - (\lambda/\Lambda) \cdot \cos\phi]^2 + [(\lambda/\Lambda) \cdot \sin\phi]^2 = (n1 \cdot \sin\theta2)^2 \quad (J1)$$

$$\sin\alpha = \lambda \cdot \sin\phi/(n1 \cdot \Lambda \cdot \sin\theta2) \quad (J2)$$

$$\lambda/\Lambda = 2 \cdot n1 \cdot \sin\theta1 \quad (J3)$$

From formulae (J1) to (J3), formula (J4) is obtained. Formula (J4) shows that the diffracted light beam is apart from the main period direction by an angle twice the direction angle φ.

$$\sin\alpha \approx 2 \cdot \sin\phi \quad (J4)$$

The diffraction grating 52 may be formed on a curved surface. In that case, as described earlier in connection with the ninth embodiment, at a given point on the diffraction grating 52, the diffraction grating is projected onto the plane P tangent thereto at that point, and the incidence angle θ1 with respect to the plane P and the period Λ as observed on the plane P are so chosen as to fulfill the relationships expressed by formulae (H1) to (H5).

In this embodiment, the diffraction grating receives two light beams LR1 and LR2. It is, however, also possible to adopt a construction in which the diffraction grating receives three or more light beams in different wavelength bands. In that case, the longest wavelength λ3U of the wavelength band in which, of all the received light beams, the one having the longest wavelength lies and the shortest wavelength λ2L of the wavelength band in which the one having the second longest wavelength lies are so chosen as to fulfill formula (H4).

Twelfth Embodiment

The optical apparatus 12 of a twelfth embodiment of the invention, too, is a transmitter/receiver apparatus for use in optical communication. This optical apparatus 12, like the optical apparatus 4 of the fourth embodiment shown in FIG. 6, transmits a light beam LT via an optical fiber 31, and receives two light beams LR1 and LR2 via the optical fiber 31. The light beams LT, LR1, and LR2 are in different wavelength bands.

Now, the design of the diffraction grating 52 formed on the diffraction grating device 51 in the optical apparatus 12 will be described. Here, it is assumed that the main period of the elevations and depressions of the diffraction grating 52 is Λ; that the height difference between the elevations and depressions of the diffraction grating 52 is h; that, of the two media between which the diffraction grating 52 is sandwiched, the one present on the side thereof on which the light beam is incident has a refractive index of n1 and the other has a refractive index of n2; that the incidence angle at which the light beam is incident on the diffraction grating 52 is θ1; the emergence angle at which the light beam emerges from the diffraction grating 52 is θ2; that, of the wavelength bands in which the light beams LT, LR1, and LR2 lie, the one covering the shortest wavelengths ranges from the shortest wavelength of λ1L to the longest wavelength of λ1U, the one covering the longest wavelengths ranges from the shortest wavelength of λ3L to the longest wavelength of λ3U, and the one covering the middle wavelengths ranges from the shortest wavelength of λ2L to the longest wavelength of λ2U.

The diffraction grating 52 fulfills the relationships (K1) to (K5) below.

$$\lambda1L < \lambda1U < \lambda2L < \lambda2U < \lambda3L < \lambda3U \quad (K1)$$

$$n2 < n1 \cdot \sin\theta1 \quad (K2)$$

$$1/(n1 + n1 \cdot \sin\theta1) \leq \Lambda/\lambda3U \leq \Lambda/\lambda2L \leq \lambda1/(n2 + n1 \cdot \sin\theta1) \quad (K3)$$

$$1/(n2 + n1 \cdot \sin\theta1) \leq \Lambda/\lambda1U \leq \Lambda/\lambda1L \leq 2/(n1 + n1 \cdot \sin\theta1) \quad (K4)$$

$$\Lambda/\lambda3L < 1/(2 \cdot n1 \cdot \sin\theta1) < \Lambda/\lambda2U \quad (K5)$$

Fulfilling these relationships, the diffraction grating 52 reflects (regularly reflects), by diffraction of the zero order, the transmitted light beam LT, and reflects, by diffraction of the minus first order, the two received light beams LR1 and LR2.

Figure 19:
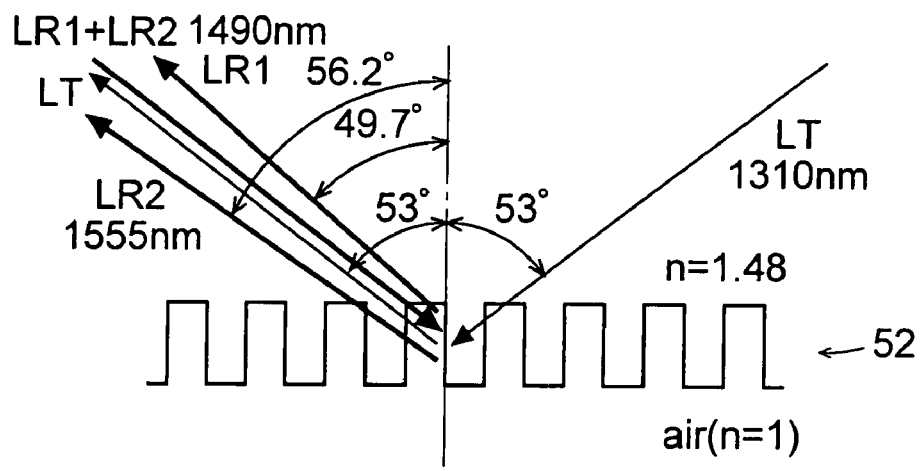
FIG. 19 is a diagram schematically showing the optical path in one practical example of the diffraction grating used in the optical apparatus of a twelfth embodiment of the invention.

FIG. 19 schematically shows the optical path observed in one practical example. In this example, the center wavelength of the received light beam LT is 1,310 nm, and the center wavelengths of the received light beams LR1 and LR2 are 1,490 nm and 1,555 nm, respectively; the light beams LT, LR1, and LR2 are made incident on the diffraction grating 52 from inside the diffraction grating device 51. The relevant parameters are listed in Table 9-1.

TABLE 9-1

Diffraction Grating 52

Sectional Shape: Rectangular
Elevation-Depression Period Λ: 0.645 μm
Elevation-Depression Height Difference h: 0.709 μm
Elevation Width: 0.451 μm
Medium Refractive Index: 1.48
Light Beam LT Wavelength ($\lambda S$): 1310 nm
Period/Wavelength ($\Lambda/\lambda S$): 0.492
Incidence Angle $\theta 1$: 53°
Emergence Angle $\theta 2$: 53°
Reflectivity: 0.96 (−0.18 dB)
Light Beam LR1

Wavelength ($\lambda M$): 1490 nm
Period/Wavelength ($\Lambda/\lambda M$): 0.433
Incidence Angle $\theta 1$: 53°
Emergence Angle $\theta 2$: −49.7°
P-Polarized Light Reflection Diffraction Efficiency: 0.81 (−0.92 dB)
S-Polarized Light Reflection Diffraction Efficiency: 0.83 (−0.79 dB)
Mean Reflection Diffraction Efficiency: 0.82 (−0.85 dB)
P- And S-Polarized Light Diffraction Efficiency Difference: 0.13 dB
Light Beam LR2

Wavelength ($\lambda L$): 1555 nm
Period/Wavelength ($\Lambda/\lambda L$): 0.415
Incidence Angle $\theta 1$: 53°
Emergence Angle $\theta 2$: −56.2°
P-Polarized Light Reflection Diffraction Efficiency: 0.88 (−0.56 dB)
S-Polarized Light Reflection Diffraction Efficiency: 0.90 (−0.45 dB)
Mean Reflection Diffraction Efficiency: 0.89 (−0.51 dB)
P- And S-Polarized Light Diffraction Efficiency Difference: 0.11 dB In Table 9-1, the elevation width of the diffraction grating 52 denotes the width of each of the parts thereof that are elevated toward the side at which the light beams LT, LR1, and LR2 are incident (i.e., toward the inside of the diffraction grating device 51).

The parameters related to the shortest wavelength ($\lambda 1L$) and the longest wavelength ($\lambda 1U$) of the light beam LT as observed when the wavelength band thereof has a width of 100 nm are listed in Tables 9-2 and 9-3. The parameters related to the shortest wavelength ($\lambda 2L$) and the longest wavelength ($\lambda 2U$) of the light beam LR1 as observed when the wavelength band thereof has a width of 20 nm are listed in Tables 9-4 and 9-5. The parameters related to the shortest wavelength ($\lambda 3L$) and the longest wavelength ($\lambda 3U$) of the light beam LR2 as observed when the wavelength band thereof has a width of 10 nm are listed in Tables 9-6 and 9-7.

TABLE 9-2

Light Beam LT

Shortest Wavelength ($\lambda 1L$): 1260 nm
Period/Wavelength ($\Lambda/\lambda 1L$): 0.512
Incidence Angle $\theta 1$: 53°
Emergence Angle $\theta 2$: 53°
Reflectivity: 1.00 (−0.01 dB)

TABLE 9-3

Light Beam LT

Longest Wavelength ($\lambda 1U$): 1360 nm
Period/Wavelength ($\Lambda/\lambda 1U$): 0.474

TABLE 9-3-continued

Light Beam LT

Incidence Angle $\theta 1$: 53°
Emergence Angle $\theta 2$: 53°
Reflectivity: 0.89 (−0.49 dB)

TABLE 9-4

Light Beam LR1

Shortest Wavelength ($\lambda 2L$): 1480 nm
Period/Wavelength ($\Lambda/\lambda 2L$): 0.436
Incidence Angle $\theta 1$: 53°
Emergence Angle $\theta 2$: −48.8°
P-Polarized Light Reflection Diffraction Efficiency: 0.76 (−1.19 dB)
S-Polarized Light Reflection Diffraction Efficiency: 0.78 (−1.09 dB)
Mean Reflection Diffraction Efficiency: 0.77 (−1.14 dB)
P- And S-Polarized Light Diffraction Efficiency Difference: 0.10 dB

TABLE 9-5

Light Beam LR1

Longest Wavelength ($\lambda 2U$): 1500 nm
Period/Wavelength ($\Lambda/\lambda 2U$): 0.430
Incidence Angle $\theta 1$: 53°
Emergence Angle $\theta 2$: −50.7°
P-Polarized Light Reflection Diffraction Efficiency: 0.85 (−0.73 dB)
S-Polarized Light Reflection Diffraction Efficiency: 0.88 (−0.58 dB)
Mean Reflection Diffraction Efficiency: 0.86 (−0.65 dB)
P- And S-Polarized Light Diffraction Efficiency Difference: 0.15 dB

TABLE 9-6

Light Beam LR2

Shortest Wavelength ($\lambda 3L$): 1550 nm
Period/Wavelength ($\Lambda/\lambda 3L$): 0.416
Incidence Angle $\theta 1$: 53°
Emergence Angle $\theta 2$: −55.7°
P-Polarized Light Reflection Diffraction Efficiency: 0.89 (−0.52 dB)
S-Polarized Light Reflection Diffraction Efficiency: 0.91 (−0.41 dB)
Mean Reflection Diffraction Efficiency: 0.90 (−0.47 dB)
P- And S-Polarized Light Diffraction Efficiency Difference: 0.11 dB

TABLE 9-7

Light Beam LR2

Longest Wavelength ($\lambda 3U$): 1560 nm
Period/Wavelength ($\Lambda/\lambda 3U$): 0.413
Incidence Angle $\theta 1$: 53°
Emergence Angle $\theta 2$: −56.8°
P-Polarized Light Reflection Diffraction Efficiency: 0.87 (−0.60 dB)
S-Polarized Light Reflection Diffraction Efficiency: 0.89 (−0.50 dB)
Mean Reflection Diffraction Efficiency: 0.88 (−0.55 dB)
P- And S-Polarized Light Diffraction Efficiency Difference: 0.10 dB The values of the lower and upper limits of formula (K3), i.e., the values of the following two formulae equal 0.376 and 0.458, respectively, and the values of the periods of the light beams LR1 and LR2 divided by the wavelengths thereof fulfill formula (K3).

$$1/(n1 + n1 \cdot \sin \theta 1)$$

$$1/(n2 + n1 \cdot \sin \theta 1)$$

Moreover, the values of the lower and upper limits of formula (K4), i.e., the values of the following two formulae equal 0.458 and 0.751, respectively, and the value of the period of the light beam LT divided by the wavelength thereof fulfills formula (K4).

$1/(n2+n1 \cdot \sin \theta1)$ $2/(n1+n1 \cdot \sin \theta1)$

Furthermore, the value of the following formula is 0.423, and the values of the periods of the light beams LR1 and LR2 divided by the wavelengths thereof fulfill formula (K5).

$1/(2 \cdot n1 \cdot \sin \theta1)$

Fulfilling formula (K3) results in higher diffraction efficiency with the light beams LR1 and LR2 having the longer wavelengths that are reflected by diffraction of the minus first order. Fulfilling formula (K4) results in higher diffraction efficiency with the light beam LT having the shorter wavelength that is regularly reflected without diffraction. Fulfilling formula (K5) results in smaller differences between the diffraction efficiency with p-polarized light and that with s-polarized light in the light beams LR1 and LR2 having the longer wavelengths. With the design described above, the difference between the diffraction efficiency with p-polarized light and that with s-polarized light is 0.10 to 0.15 dB in the light beam LR1 and 0.10 to 0.11 dB in the light beam LR2.

For comparison, the parameters as observed in a design that fulfills formulae (K1) to (K4) but does not fulfill formula (K5) are listed in Tables 10-1 to 10-7.

TABLE 10-1

Diffraction Grating

Sectional Shape: Rectangular
Elevation-Depression Period Λ: 0.629 μm
Elevation-Depression Height Difference h: 0.645 μm
Elevation Width: 0.239 μm
Medium Refractive Index: 1.5
Light Beam LT Wavelength (λS): 1310 nm
Period/Wavelength (Λ/λS): 0.480
Incidence Angle θ1: 51°
Emergence Angle θ2: 51°
Reflectivity: 0.76 (−1.21 dB)
Light Beam LR1

Wavelength (λM): 1490 nm
Period/Wavelength (Λ/λM): 0.422
Incidence Angle θ1: 51°
Emergence Angle θ2: −53.3°
P-Polarized Light Reflection Diffraction Efficiency: 0.95 (−0.22 dB)
S-Polarized Light Reflection Diffraction Efficiency: 0.85 (−0.72 dB)
Mean Reflection Diffraction Efficiency: 0.90 (−0.46 dB)
P- And S-Polarized Light Diffraction Efficiency Difference: 0.51 dB
Light Beam LR2

Wavelength (λL): 1555 nm
Period/Wavelength (Λ/λL): 0.405
Incidence Angle θ1: 51°
Emergence Angle θ2: −60.6°
P-Polarized Light Reflection Diffraction Efficiency: 0.76 (−1.17 dB)
S-Polarized Light Reflection Diffraction Efficiency: 0.75 (−1.23 dB)
Mean Reflection Diffraction Efficiency: 0.76 (−1.20 dB)
P- And S-Polarized Light Diffraction Efficiency Difference: 0.06 dB

TABLE 10-2

Light Beam LT

Shortest Wavelength (λ1L): 1260 nm
Period/Wavelength (Λ/λ1L): 0.499
Incidence Angle θ1: 51°
Emergence Angle θ2: 51°
Reflectivity: 0.87 (−0.63 dB)

TABLE 10-3

Light Beam LT

Longest Wavelength (λ1U): 1360 nm
Period/Wavelength (Λ/λ1U): 0.463
Incidence Angle θ1: 51°
Emergence Angle θ2: 51°
Reflectivity: 0.74 (−1.32 dB)

TABLE 10-4

Light Beam LR1

Shortest Wavelength (λ2L): 1480 nm
Period/Wavelength (Λ/λ2L): 0.425
Incidence Angle θ1: 51°
Emergence Angle θ2: −52.3°
P-Polarized Light Reflection Diffraction Efficiency: 0.96 (−0.17 dB)
S-Polarized Light Reflection Diffraction Efficiency: 0.84 (−0.76 dB)
Mean Reflection Diffraction Efficiency: 0.90 (−0.45 dB)
P- And S-Polarized Light Diffraction Efficiency Difference: 0.59 dB

TABLE 10-5

Light Beam LR1

Longest Wavelength (λ2U): 1500 nm
Period/Wavelength (Λ/λ2U): 0.419
Incidence Angle θ1: 51°
Emergence Angle θ2: −54.4°
P-Polarized Light Reflection Diffraction Efficiency: 0.93 (−0.30 dB)
S-Polarized Light Reflection Diffraction Efficiency: 0.85 (−0.73 dB)
Mean Reflection Diffraction Efficiency: 0.89 (−0.51 dB)
P- And S-Polarized Light Diffraction Efficiency Difference: 0.43 dB

TABLE 10-6

Light Beam LR2

Shortest Wavelength (λ3L): 1550 nm
Period/Wavelength (Λ/λ3L): 0.406
Incidence Angle θ1: 51°
Emergence Angle θ2: −60.0°
P-Polarized Light Reflection Diffraction Efficiency: 0.78 (−1.06 dB)
S-Polarized Light Reflection Diffraction Efficiency: 0.77 (−1.15 dB)
Mean Reflection Diffraction Efficiency: 0.78 (−1.11 dB)
P- And S-Polarized Light Diffraction Efficiency Difference: 0.09 dB

TABLE 10-7

Light Beam LR2

Longest Wavelength (λ3U): 1560 nm
Period/Wavelength (Λ/λ3U): 0.403
Incidence Angle θ1: 51°
Emergence Angle θ2: −61.2°
P-Polarized Light Reflection Diffraction Efficiency: 0.74 (−1.28 dB)
S-Polarized Light Reflection Diffraction Efficiency: 0.74 (−1.31 dB)

TABLE 10-7-continued

Light Beam LR2

Mean Reflection Diffraction Efficiency: 0.74 (−1.30 dB)
P- And S-Polarized Light Diffraction Efficiency Difference: 0.03 dB With this design, the values of the lower and upper limits of formula (K3) are 0.375 and 0.462, respectively, and the values of the lower and upper limits of formula (K4) are 0.462 and 0.750, respectively. Thus, formulae (K3) and (K4) are fulfilled. On the other hand, the value of $1/(2 \cdot n1 \cdot \sin \theta)$ is 0.429. Thus, formula (K5) is not fulfilled.

The difference between the diffraction efficiency with p-polarized light and that with s-polarized light is as small as 0.03 to 0.09 in the light beam LR2 but as large as 0.43 to 0.59 in the light beam LR3. Consequently, the amount of light received by the light receiver 43 (see FIG. 6) that receives the light beam LR2 greatly depends on the direction of the polarization plane of the light beam LT3. Thus, to permit the light receiver 43 to receive a sufficiently large amount of light, consideration needs to be given to the direction of the polarization plane of the light beam LT3 anew from one optical apparatus to another. This makes it difficult to arrange the optical fiber 31 relative to the diffraction grating device 51 and other components.

By contrast, in the optical apparatus 12 of this embodiment, of which an example is listed in Tables 9-1 to 9-7, as described previously, the difference between the diffraction efficiency with p-polarized light and that with s-polarized light is small both in the light beams LR1 and LR2, and the amounts of light received by the light receivers 42 and 43 do not greatly depend on the directions of the polarization planes of the light beams LR1 and LR2. Thus, it is possible to permit the light receivers 42 and 43 to receive sufficiently large amounts of light even with no consideration given to the directions of the polarization planes of the light beams LR1 and LR2.

The diffraction grating 52 may be formed on a curved surface. In that case, as described earlier in connection with the ninth embodiment, at a given point on the diffraction grating 52, the diffraction grating is projected onto the plane P tangent thereto at that point, and the incidence angle θ1 with respect to the plane P and the period Λ as observed on the plane P are so chosen as to fulfill the relationships expressed by formulae (K1) to (K5).

The diffraction efficiency observed when, in the practical example listed in Tables 9-1 to 9-7, the elevation width of the diffraction grating 52 is varied by 0.05 μm is listed in Table 11. Table 11 lists, for each of the light beams LT, LR1, and LR2, the diffraction efficiency observed at whichever of the shortest, center, and longest wavelengths yields the lowest diffraction efficiency. The values are all dB equivalent values.

TABLE 11

| | Elevation Width | | |
|---|---|---|---|
| | Decrease 0.401 μm | Design Value 0.451 μm | Increase 0.501 μm |
| Light Beam LT (1310 nm Wavelength Band) | | | |
| Reflectivity | −1.337 | −0.490 | −0.095 |
| Reflectivity Variation | −0.847 | | 0.395 |

TABLE 11-continued

| | Elevation Width | | |
|---|---|---|---|
| | Decrease 0.401 μm | Design Value 0.451 μm | Increase 0.501 μm |
| Light Beam LR1 (1490 nm Wavelength Band) | | | |
| Diffraction Efficiency | −1.226 | −1.136 | −2.562 |
| Diffraction Efficiency Variation | −0.090 | | −1.425 |
| P- And S-Polarized Light Diffraction Efficiency Difference | 1.851 | 0.149 | 3.458 |
| P- And S-Polarized Light Diffraction Efficiency Difference Variation | 1.702 | | 3.309 |
| Light Beam LR2 (1555 nm Wavelength Band) | | | |
| Diffraction Efficiency | −0.501 | −0.552 | −1.184 |
| Diffraction Efficiency Variation | 0.051 | | −0.632 |
| P- And S-Polarized Light Diffraction Efficiency Difference | 0.558 | 0.113 | 1.762 |
| P- And S-Polarized Light Diffraction Efficiency Difference Variation | 0.445 | | 1.649 |

Table 11 shows that, when the elevation width varies from the design value, a great difference results between the diffraction efficiency with p-polarized light and that with s-polarized light in the light beams LR1 and LR2 having the longer wavelengths. As will be described below, however, this variation in the difference in diffraction efficiency resulting from a variation in the elevation width can be reduced.

Thirteenth Embodiment

The optical apparatus 13 of a thirteenth embodiment of the invention is a modified version of the optical apparatus 12 described above, the modification being such that, even when the elevation width of the diffraction grating 52 varies, no great difference results between the diffraction efficiency with p-polarized light and that with s-polarized light. In the optical apparatus 13, as in the optical apparatus 11 of the eleventh embodiment, as shown in FIG. 16, the elevations and depressions of the diffraction grating 52 have separate periods in a first and a second direction that are perpendicular to each other. The period Λx in the first direction is smaller than the period Λy in the second direction, with the former referred to as the main period and the latter as the sub period. The difference in the optical apparatus 13 is that the light beams LT, LR1, and LR3 are made incident on the diffraction grating 52 from a direction perpendicular to the sub period direction. Thus, the direction angle φ shown in FIG. 17 is here 0°.

Also in this embodiment, the diffraction grating 52 fulfills the relationships expressed by formulae (K1) to (K5) noted earlier. Here, the main period Λx is substituted in Λ appearing in formulae (K3) to (K5).

The relevant parameters as observed in a design corresponding to that listed in Tables 9-1 to 9-7 are listed in Tables 12-1 to 12-7. Here, the main period Λx is assumed to be equal to the sub period Λy. The optical path of the light beams LT, LR1, and LR2 is the same as shown in FIG. 19.

TABLE 12-1

Diffraction Grating 52

Sectional Shape: Rectangular
Elevation-Depression Main Period Λx (Λ): 0.645 μm
Elevation-Depression Sub Period Λx: 0.645 μm
Sub Period/Main Period (Λy/Λx): 1
Elevation-Depression Height Difference h: 0.645 μm
Main-Period-Direction Elevation Width Wx: 0.387 μm
Sub-Period-Direction Elevation Width Wy: 0.064 μm
Medium Refractive Index: 1.48
Light Beam LT Wavelength (λS): 1310 nm
Period/Wavelength (Λx/λS): 0.492
Incidence Angle θ1: 53°
Emergence Angle θ2: 53°
Reflectivity: 0.84 (−0.77 dB)
Light Beam LR1

Wavelength (λM): 1490 nm
Period/Wavelength (Λx/λM): 0.433
Incidence Angle θ1: 53°
Emergence Angle θ2: −49.7°
P-Polarized Light Reflection Diffraction Efficiency: 0.89 (−0.50 dB)
S-Polarized Light Reflection Diffraction Efficiency: 0.85 (−0.68 dB)
Mean Reflection Diffraction Efficiency: 0.87 (−0.59 dB)
P- And S-Polarized Light Diffraction Efficiency Difference: 0.18 dB
Light Beam LR2

Wavelength (λL): 1555 nm
Period/Wavelength (Λx/λL): 0.415
Incidence Angle θ1: 53°
Emergence Angle θ2: −56.2°
P-Polarized Light Reflection Diffraction Efficiency: 0.87 (−0.62 dB)
S-Polarized Light Reflection Diffraction Efficiency: 0.96 (−0.20 dB)
Mean Reflection Diffraction Efficiency: 0.91 (−0.40 dB)
P- And S-Polarized Light Diffraction Efficiency Difference: 0.42 dB

TABLE 12-2

Light Beam LT

Shortest Wavelength (λ1L): 1260 nm
Period/Wavelength (Λx/λ1L): 0.512
Incidence Angle θ1: 53°
Emergence Angle θ2: 53°
Reflectivity: 0.91 (−0.40 dB)

TABLE 12-3

Light Beam LT

Longest Wavelength (λ1U): 1360 nm
Period/Wavelength (Λx/λ1U): 0.474
Incidence Angle θ1: 53°
Emergence Angle θ2: 53°
Reflectivity: 0.76 (−1.19 dB)

TABLE 12-4

Light Beam LR1

Shortest Wavelength (λ2L): 1480 nm
Period/Wavelength (Λx/λ2L): 0.436
Incidence Angle θ1: 53°
Emergence Angle θ2: −48.8°
P-Polarized Light Reflection Diffraction Efficiency: 0.86 (−0.63 dB)
S-Polarized Light Reflection Diffraction Efficiency: 0.80 (−0.96 dB)
Mean Reflection Diffraction Efficiency: 0.83 (−0.80 dB)
P- And S-Polarized Light Diffraction Efficiency Difference: 0.33 dB

TABLE 12-5

Light Beam LR1

Longest Wavelength (λ2U): 1500 nm
Period/Wavelength (Λx/λ2U): 0.430
Incidence Angle θ1: 53°
Emergence Angle θ2: −50.7°
P-Polarized Light Reflection Diffraction Efficiency: 0.91 (−0.42 dB)
S-Polarized Light Reflection Diffraction Efficiency: 0.90 (−0.47 dB)
Mean Reflection Diffraction Efficiency: 0.90 (−0.45 dB)
P- And S-Polarized Light Diffraction Efficiency Difference: 0.05 dB

TABLE 12-6

Light Beam LR2

Shortest Wavelength (λ3L): 1550 nm
Period/Wavelength (Λx/λ3L): 0.416
Incidence Angle θ1: 53°
Emergence Angle θ2: −55.7°
P-Polarized Light Reflection Diffraction Efficiency: 0.88 (−0.56 dB)
S-Polarized Light Reflection Diffraction Efficiency: 0.96 (−0.17 dB)
Mean Reflection Diffraction Efficiency: 0.92 (−0.36 dB)
P- And S-Polarized Light Diffraction Efficiency Difference: 0.39 dB

TABLE 12-7

Light Beam LR2

Longest Wavelength (λ3U): 1560 nm
Period/Wavelength (Λx/λ3U): 0.413
Incidence Angle θ1: 53°
Emergence Angle θ2: −56.8°
P-Polarized Light Reflection Diffraction Efficiency: 0.85 (−0.68 dB)
S-Polarized Light Reflection Diffraction Efficiency: 0.95 (−0.23 dB)
Mean Reflection Diffraction Efficiency: 0.90 (−0.45 dB)
P- And S-Polarized Light Diffraction Efficiency Difference: 0.45 dB With this design, the values of the lower and upper limits of formula (K3) are 0.376 and 0.458, respectively, and the values of the lower and upper limits of formula (K4) are 0.458 and 0.751, respectively. Thus, formulae (K3) and (K4) are fulfilled. Moreover, the value of $1/(2 \cdot n1 \cdot \sin \theta)$ is 0.423. Thus, formula (K5), too, is fulfilled.

The diffraction efficiency observed when, in the practical example listed in Tables 12-1 to 12-7, the elevation width of the diffraction grating 52 in the main and sub period directions is varied by 0.05 μm is listed in Tables 13-1 and 13-2. Tables 13-1 and 13-2 list, for each of the light beams LT, LR1, and LR2, the diffraction efficiency observed at whichever of the shortest, center, and longest wavelengths yields the lowest diffraction efficiency. The values are all dB equivalent values.

TABLE 13-1

| Main-Period-Direction Elevation Width | | | |
|---|---|---|---|
| | Decrease 0.337 μm | Design Value 0.387 μm | Increase 0.437 μm |
| Light Beam LT (1310 nm Wavelength Band) | | | |
| Reflectivity | −1.608 | −1.188 | −0.589 |
| Reflectivity Variation | −0.419 | | 0.599 |
| Light Beam LR1 (1490 nm Wavelength Band) | | | |
| Diffraction Efficiency | −0.724 | −0.795 | −1.071 |
| Diffraction Efficiency Variation | 0.071 | | −0.276 |
| P- And S-Polarized Light | 0.678 | 0.332 | 1.052 |

TABLE 13-1-continued

Main-Period-Direction Elevation Width

| | Decrease 0.337 μm | Design Value 0.387 μm | Increase 0.437 μm |
|---|---|---|---|
| Diffraction Efficiency Difference | | | |
| P- And S-Polarized Light Diffraction Efficiency Difference Variation | 0.346 | | 0.720 |

Light Beam LR2 (1555 nm Wavelength Band)

| | | | |
|---|---|---|---|
| Diffraction Efficiency | −0.394 | −0.448 | −0.663 |
| Diffraction Efficiency Variation | 0.054 | | −0.214 |
| P- And S-Polarized Light Diffraction Efficiency Difference | 0.458 | 0.453 | 0.928 |
| P- And S-Polarized Light Diffraction Efficiency Difference Variation | 0.004 | | 0.475 |

TABLE 13-2

Sub-Period-Direction Elevation Width

| | Decrease 0.014 μm | Design Value 0.064 μm | Increase 0.114 μm |
|---|---|---|---|
| Light Beam LT (1310 nm Wavelength Band) | | | |
| Reflectivity | −1.556 | −1.188 | −0.806 |
| Reflectivity Variation | −0.367 | | 0.383 |
| Light Beam LR1 (1490 nm Wavelength Band) | | | |
| Diffraction Efficiency | −0.757 | −0.795 | −0.937 |
| Diffraction Efficiency Variation | 0.038 | | −0.142 |
| P- And S-Polarized Light Diffraction Efficiency Difference | 0.754 | 0.332 | 0.511 |
| P- And S-Polarized Light Diffraction Efficiency Difference Variation | 0.422 | | 0.179 |
| Light Beam LR2 (1555 nm Wavelength Band) | | | |
| Diffraction Efficiency | −0.375 | −0.448 | −0.580 |
| Diffraction Efficiency Variation | 0.073 | | −0.131 |
| P- And S-Polarized Light Diffraction Efficiency Difference | 0.256 | 0.453 | 0.768 |
| P- And S-Polarized Light Diffraction Efficiency Difference Variation | −0.198 | | 0.314 |

It will be understood that, whereas the variation of the elevation width of the diffraction grating 52 is the same between in Table 11 and Tables 13-1 and 13-2 (i.e., ±0.05 μm), the increase in the difference between the diffraction efficiency with p-polarized light and that with s-polarized light in the light beams LR1 and LR2 having the longer wavelengths is minimized in this embodiment.

Now, a description will be given of the relationship between the sub period $\Lambda y$ of the diffraction grating 52 and the diffracted light. Let the wavelength of light be $\lambda$, the order of the diffraction produced by the main period $\Lambda x$ be mx, and the order of the diffraction produced by the sub period $\Lambda y$ be my. Then, the condition under which diffracted light of orders mx, my) is produced is expressed by formula (M1).

$$[(n2/n1)\cdot\sin\theta 1\cdot\cos\phi+mx\cdot\lambda/(n2\cdot\Lambda x)]^2+[(n2/n1)\cdot\sin\theta 1\cdot\cos\phi+my/(n2\cdot\Lambda y)]^2 \leq 1 \quad (M1)$$

In the optical apparatus 13, diffraction of orders (−1, 0), i.e., with mx=−1 and my=0, needs to be produced in the light beams LR1 and LR2 with high diffraction efficiency. To achieve this, diffraction of other orders needs to be reduced. Here, of all the diffracted light of other orders than orders (−1, 0), the most likely to be produced is that of orders (−1, ±1), i.e., with mx=−1 and my=±1. The condition under which no diffracted light of orders (−1, ±1) is produced in the light beams LR1 and LR2 is expressed by formula (M2).

$$[\sin\theta 1-\lambda 2L/(n1\cdot\Lambda x)]^2+\{\lambda 2L/(n1\cdot\Lambda y)\}^2>1 \quad (M2)$$

Formula (M2) can be rearranged to obtain formula (M3).

$$\Lambda y^2/\lambda 2L^2<1/\{n1^2\cdot[1-(\sin\theta 1-\lambda 2L/(n1\cdot\Lambda x))^2]\} \quad (M3)$$

Here, fulfilling formula (M4) suffices to reduce the diffracted light of orders (−1, ±1) produced in the light beams LR1 and LR2.

$$\Lambda y^2/\lambda 2L^2<1/\{n1^2\cdot[1-(\sin\theta 1-1.1\cdot\lambda 2L/(n1\cdot\Lambda x))^2]\} \quad (M4)$$

For easy production of the diffraction grating 52, it is preferable that the sub period $\Lambda y$ be greater than the main period $\Lambda x$; specifically, it is preferable that formula (M5) be fulfilled.

$$\Lambda x^2/\lambda 2L^2 \leq \Lambda y^2/\lambda 2L^2 \quad (M5)$$

The relevant parameters observed in a design in which, in addition to formulae (K1) to (K5), formulae (M4) and (M5) are fulfilled are listed in Tables 14-1 to 14-7. Here, the sub period $\Lambda y$ is twice the main period $\Lambda x$.

TABLE 14-1

Diffraction Grating 52

Sectional Shape: Rectangular
Elevation-Depression Main Period $\Lambda x$ ($\Lambda$): 0.649 μm
Elevation-Depression Sub Period $\Lambda x$: 1.298 μm
Sub Period/Main Period ($\Lambda y/\Lambda x$): 2
Elevation-Depression Height Difference h: 0.649 μm
Main-Period-Direction Elevation Width Wx: 0.389 μm
Sub-Period-Direction Elevation Width Wy: 0.130 μm
Medium Refractive Index: 1.48
Light Beam LT Wavelength ($\lambda S$): 1310 nm
Period/Wavelength ($\Lambda x/\lambda S$): 0.495
Incidence Angle $\theta 1$: 52.5°
Emergence Angle $\theta 2$: 52.5°
Reflectivity: 0.81 (−0.90 dB)
Light Beam LR1

Wavelength ($\lambda M$): 1490 nm
Period/Wavelength ($\Lambda x/\lambda M$): 0.436
Incidence Angle $\theta 1$: 52.5°
Emergence Angle $\theta 2$: −49.3°
P-Polarized Light Reflection Diffraction Efficiency: 0.88 (−0.55 dB)
S-Polarized Light Reflection Diffraction Efficiency: 0.85 (−0.71 dB)
Mean Reflection Diffraction Efficiency: 0.86 (−0.63 dB)
P- And S-Polarized Light Diffraction Efficiency Difference: 0.16 dB
Light Beam LR2

Wavelength ($\lambda L$): 1555 nm
Period/Wavelength ($\Lambda x/\lambda L$): 0.417
Incidence Angle $\theta 1$: 52.5°
Emergence Angle $\theta 2$: −55.7°
P-Polarized Light Reflection Diffraction Efficiency: 0.87 (−0.59 dB)
S-Polarized Light Reflection Diffraction Efficiency: 0.95 (−0.23 dB)
Mean Reflection Diffraction Efficiency: 0.91 (−0.41 dB)
P- And S-Polarized Light Diffraction Efficiency Difference: 0.35 dB

TABLE 14-2

| Light Beam LT |
| --- |
| Shortest Wavelength (λ1L): 1260 nm |
| Period/Wavelength (Λx/λ1L): 0.515 |
| Incidence Angle θ1: 52.5° |
| Emergence Angle θ2: 52.5° |
| Reflectivity: 0.88 (−0.57 dB) |

TABLE 14-3

| Light Beam LT |
| --- |
| Longest Wavelength (λ1U): 1360 nm |
| Period/Wavelength (Λx/λ1U): 0.477 |
| Incidence Angle θ1: 52.5° |
| Emergence Angle θ2: 52.5° |
| Reflectivity: 0.76 (−1.21 dB) |

TABLE 14-4

| Light Beam LR1 |
| --- |
| Shortest Wavelength (λ2L): 1480 nm |
| Period/Wavelength (Λx/λ2L): 0.438 |
| Incidence Angle θ1: 52.5° |
| Emergence Angle θ2: −48.4° |
| P-Polarized Light Reflection Diffraction Efficiency: 0.85 (−0.70 dB) |
| S-Polarized Light Reflection Diffraction Efficiency: 0.79 (−1.00 dB) |
| Mean Reflection Diffraction Efficiency: 0.82 (−0.85 dB) |
| P- And S-Polarized Light Diffraction Efficiency Difference: 0.30 dB |

TABLE 14-5

| Light Beam LR1 |
| --- |
| Longest Wavelength (λ2U): 1500 nm |
| Period/Wavelength (Λx/λ2U): 0.433 |
| Incidence Angle θ1: 52.5° |
| Emergence Angle θ2: −50.2° |
| P-Polarized Light Reflection Diffraction Efficiency: 0.90 (−0.45 dB) |
| S-Polarized Light Reflection Diffraction Efficiency: 0.89 (−0.50 dB) |
| Mean Reflection Diffraction Efficiency: 0.90 (−0.48 dB) |
| P- And S-Polarized Light Diffraction Efficiency Difference: 0.05 dB |

TABLE 14-6

| Light Beam LR2 |
| --- |
| Shortest Wavelength (λ3L): 1550 nm |
| Period/Wavelength (Λx/λ3L): 0.419 |
| Incidence Angle θ1: 52.5° |
| Emergence Angle θ2: −55.1° |
| P-Polarized Light Reflection Diffraction Efficiency: 0.88 (−0.53 dB) |
| S-Polarized Light Reflection Diffraction Efficiency: 0.95 (−0.21 dB) |
| Mean Reflection Diffraction Efficiency: 0.92 (−0.37 dB) |
| P- And S-Polarized Light Diffraction Efficiency Difference: 0.33 dB |

TABLE 14-7

| Light Beam LR2 |
| --- |
| Longest Wavelength (λ3U): 1560 nm |
| Period/Wavelength (Λx/λ3U): 0.416 |
| Incidence Angle θ1: 52.5° |
| Emergence Angle θ2: −56.2° |
| P-Polarized Light Reflection Diffraction Efficiency: 0.86 (−0.64 dB) |
| S-Polarized Light Reflection Diffraction Efficiency: 0.94 (−0.26 dB) |

TABLE 14-7-continued

| Light Beam LR2 |
| --- |
| Mean Reflection Diffraction Efficiency: 0.90 (−0.45 dB) |
| P- And S-Polarized Light Diffraction Efficiency Difference: 0.38 dB |

With this design, the values of the lower and upper limits of formula (K3) are 0.377 and 0.460, respectively, and the values of the lower and upper limits of formula (K4) are 0.460 and 0.754, respectively. Moreover, the value of $1/(2 \cdot n1 \cdot \sin \theta1)$ appearing in formula (K5) is 0.426. The sub period Λy, which corresponds to the upper limit value of formula (M3), is 1.338 μm.

The diffraction efficiency observed when, in the practical example listed in Tables 14-1 to 14-7, the elevation width of the diffraction grating 52 in the main and sub period directions is varied by 0.05 μm is listed in Tables 15-1 and 15-2. Tables 15-1 and 15-2 list, for each of the light beams LT, LR1, and LR2, the diffraction efficiency observed at whichever of the shortest, center, and longest wavelengths yields the lowest diffraction efficiency. The values are all dB equivalent values.

TABLE 15-1

Main-Period-Direction Elevation Width

| | Decrease 0.339 μm | Design Value 0.389 μm | Increase 0.439 μm |
| --- | --- | --- | --- |
| Light Beam LT (1310 nm Wavelength Band) | | | |
| Reflectivity | −1.685 | −1.208 | −0.597 |
| Reflectivity Variation | −0.477 | | 0.611 |
| Light Beam LR1 (1490 nm Wavelength Band) | | | |
| Diffraction Efficiency | −0.796 | −0.848 | −1.125 |
| Diffraction Efficiency Variation | 0.052 | | −0.276 |
| P- And S-Polarized Light Diffraction Efficiency Difference | 0.808 | 0.300 | 1.155 |
| P- And S-Polarized Light Diffraction Efficiency Difference Variation | 0.508 | | 0.855 |
| Light Beam LR2 (1555 nm Wavelength Band) | | | |
| Diffraction Efficiency | −0.370 | −0.449 | −0.649 |
| Diffraction Efficiency Variation | 0.079 | | −0.200 |
| P- And S-Polarized Light Diffraction Efficiency Difference | 0.340 | 0.382 | 0.898 |
| P- And S-Polarized Light Diffraction Efficiency Difference Variation | −0.042 | | 0.515 |

TABLE 15-2

Sub-Period-Direction Elevation Width

| | Decrease 0.080 μm | Design Value 0.130 μm | Increase 0.180 μm |
| --- | --- | --- | --- |
| Light Beam LT (1310 nm Wavelength Band) | | | |
| Reflectivity | −1.388 | −1.208 | −1.103 |
| Reflectivity Variation | −0.180 | | 0.105 |
| Light Beam LR1 (1490 nm Wavelength Band) | | | |
| Diffraction Efficiency | −0.803 | −0.848 | −0.933 |
| Diffraction Efficiency Variation | 0.045 | | −0.085 |

TABLE 15-2-continued

Sub-Period-Direction Elevation Width

| | Decrease 0.080 μm | Design Value 0.130 μm | Increase 0.180 μm |
|---|---|---|---|
| P- And S-Polarized Light Diffraction Efficiency Difference | 0.808 | 0.300 | 0.327 |
| P- And S-Polarized Light Diffraction Efficiency Difference Variation | 0.508 | | 0.027 |
| Light Beam LR2 (1555 nm Wavelength Band) | | | |
| Diffraction Efficiency | −0.370 | −0.449 | −0.522 |
| Diffraction Efficiency Variation | 0.079 | | −0.073 |
| P- And S-Polarized Light Diffraction Efficiency Difference | 0.340 | 0.382 | 0.579 |
| P- And S-Polarized Light Diffraction Efficiency Difference Variation | −0.042 | | 0.197 |

The comparison of Tables 13-1 and 13-2 with Tables 15-1 and 15-2 shows that, by making the sub period $\Lambda y$ greater than the main period $\Lambda x$, it is possible to more effectively minimize the increase in the difference between the diffraction efficiency with p-polarized light and that with s-polarized light in the light beams LR1 and LR2 resulting from a variation in the elevation width.

Obviously, many modifications and variations of the present invention are possible in light of the above teachings. It is therefore to be understood that within the scope of the appended claims, the invention may be practiced other than as specifically described.

What is claimed is:

1. A diffraction grating device that diffracts and reflects a light beam in a first band of wavelengths and that diffracts and reflects and thereby separates a plurality of light beams in a plurality of bands of wavelengths longer than the wavelengths of the first band, the plurality of light beams being incident from a direction in which the light beam in the first band of wavelengths is diffracted, wherein elevations and depressions on a diffraction grating have a first period in a first direction and a second period longer than the first period in a second direction perpendicular to the first direction, and wherein the following relationships are fulfilled:

$\lambda 1L < \lambda 1U < \lambda 2L < \lambda 2U < \lambda 3L < \lambda 3U;$ $n2 < n1 \cdot \sin \theta;$ $\phi \neq 0;$ $1/[n1 \cdot (1-\sin^2 \theta \cdot \sin^2 \phi)^{1/2} + n1 \cdot \sin \theta \cdot \cos \phi] \leq \Lambda/\lambda 3U < \Lambda/\lambda 2L \leq 1/[(n2^2 - n1^2 \cdot \sin^2 \theta \cdot \sin^2 \phi)^{1/2} + n1 \cdot \sin \theta \cdot \cos \phi];$ and $1/[(n2^2 - n1^2 \cdot \sin^2 \theta \cdot \sin^2 \phi)^{1/2} + n1 \cdot \sin \theta \cdot \cos \phi] \leq \Lambda/\lambda 1U < \Lambda/\lambda 1L \leq 2/[n1 \cdot (1-\sin^2 \theta \cdot \sin^2 \phi)^{1/2} + n1 \cdot \sin \theta \cdot \cos \phi],$ where $n1$ represents a refractive index of a first medium present on a side of the diffraction grating that faces optical paths of the light beams;

$n2$ represents a refractive index of a second medium present on a side of the diffraction grating opposite to the side thereof facing the optical paths of the light beams;

$\theta$ represents an incidence angle at which a principal ray of the light beams is incident on the diffraction grating;

$\phi$ represents an angle between a plane perpendicular to the diffraction grating and parallel to the first direction and an incidence plane of the principal ray of the light beams;

$\Lambda$ represents the first period of the elevations and depressions on the diffraction grating;

$\lambda 1L$ represents a shortest wavelength of the first band of wavelengths;

$\lambda 1U$ represents a longest wavelength of the first band of wavelengths;

$\lambda 2L$ represents a shortest wavelength of, of the plurality of bands of wavelengths longer than the wavelengths of the first band, a band of shortest wavelengths;

$\lambda 2U$ represents a longest wavelength of, of the plurality of bands of wavelengths longer than the wavelengths of the first band, a band of shortest wavelengths;

$\lambda 3L$ represents a shortest wavelength of, of the plurality of bands of wavelengths longer than the wavelengths of the first band, a band of longest wavelengths; and $\lambda 3U$ represents a longest wavelength of, of the plurality of bands of wavelengths longer than the wavelengths of the first band, a band of longest wavelengths.

2. An optical apparatus comprising a first optical component that supplies a light beam in a first band of wavelengths and a second optical component that supplies a plurality of light beams in different bands of wavelengths longer than the wavelengths of the first band and that receives the light beam in the first band of wavelengths from the first optical component, wherein the optical apparatus comprises the diffraction grating device of claim 1, and uses the diffraction grating to diffract and reflect and thereby direct the light beam from the first optical component to the second optical component and to diffract and reflect and thereby separate the plurality of light beams from the second optical component.

3. The optical apparatus of claim 2, wherein the second optical component is an optical fiber.

4. The optical apparatus of claim 2, wherein the optical apparatus further comprises an optical component that condenses a light beam incident on or emerging from the diffraction grating.

* * * * *